US011979238B2

(12) United States Patent
Thomas et al.

(10) Patent No.: US 11,979,238 B2
(45) Date of Patent: May 7, 2024

(54) V2X HARQ PROCESS MANAGEMENT

(71) Applicant: Fraunhofer-Gesellschaft zur Förderung der angewandten Forschung e.V., Munich (DE)

(72) Inventors: Robin Thomas, Berlin (DE); Thomas Fehrenbach, Berlin (DE); Baris Göktepe, Berlin (DE); Cornelius Hellge, Berlin (DE); Thomas Wirth, Berlin (DE); Thomas Schierl, Berlin (DE); Sarun Selvanesan, Berlin (DE); Roya Ebrahim Rezagah, Berlin (DE)

(73) Assignee: Fraunhofer-Gesellschaft zur Förderung der angewandten Forschung e. V., Munich (DE)

( * ) Notice: Subject to any disclaimer, the term of this patent is extended or adjusted under 35 U.S.C. 154(b) by 448 days.

(21) Appl. No.: 17/402,178

(22) Filed: Aug. 13, 2021

(65) Prior Publication Data
US 2021/0376962 A1 Dec. 2, 2021

Related U.S. Application Data

(63) Continuation of application No. PCT/EP2020/053892, filed on Feb. 14, 2020.

(30) Foreign Application Priority Data

Feb. 15, 2019 (EP) .................... 19157565

(51) Int. Cl.
*H04L 1/18* (2023.01)
*H04L 1/1812* (2023.01)
(Continued)

(52) U.S. Cl.
CPC .......... *H04L 1/1845* (2013.01); *H04L 1/1812* (2013.01); *H04L 1/1864* (2013.01); *H04W 72/20* (2023.01); *H04W 4/40* (2018.02)

(58) Field of Classification Search
CPC ....... H04W 4/40; H04W 72/23; H04W 76/14; H04W 72/121; H04W 76/16;
(Continued)

(56) References Cited

U.S. PATENT DOCUMENTS

2007/0008990 A1  1/2007  Torsner
2012/0230245 A1  9/2012  Östergaard et al.
(Continued)

FOREIGN PATENT DOCUMENTS

CN      1788448 A    6/2006
CN    103460775 A   12/2013
(Continued)

OTHER PUBLICATIONS

Erik Dahlman et al., "5G NR: The Next Generation Wireless Access Technology", Apple Books—see the cover page and the relevant pp. 213, 214, https://www.elsevier.com/books/5g-nr/dahlman/978-0-12-822320-8.
(Continued)

*Primary Examiner* — Awet Haile
(74) *Attorney, Agent, or Firm* — NKL LAW; Jae Youn Kim

(57) ABSTRACT

A user device, UE, for a wireless communication system is described. The wireless communication system includes a plurality of user devices, UEs. The UE communicates with one or more transmitting UEs using a sidelink, supports a certain number of HARQ processes, and buffers one or more transmissions for each HARQ process. During a unicast communication with a transmitting UE using the sidelink, the UE receives from the transmitting UE a transmission during a transmission time interval, the transmission associated to control data, e.g. SCI, including a HARQ process ID, buffers the received transmission for the HARQ process, and combines the buffered transmissions prior to decoding.

(Continued)

In case a successfully identified transmission is not buffered, the UE indicates to the transmitting UE that the transmission is not buffered at the UE.

18 Claims, 8 Drawing Sheets

(51) Int. Cl.
    *H04L 1/1829*     (2023.01)
    *H04W 72/04*     (2023.01)
    *H04W 72/20*     (2023.01)
    *H04W 4/40*     (2018.01)

(58) Field of Classification Search
    CPC .... H04W 8/005; H04W 92/18; H04L 1/1822; H04L 1/1812; H04L 1/1896; H04L 1/1816; H04L 1/1887; H04L 2001/0092
    See application file for complete search history.

(56) References Cited

U.S. PATENT DOCUMENTS

| | | |
|---|---|---|
| 2017/0272384 A1 | 9/2017 | Lee et al. |
| 2017/0289995 A1 | 10/2017 | Lin et al. |
| 2018/0013521 A1* | 1/2018 | Lee ...................... H04L 1/1851 |
| 2019/0014563 A1 | 1/2019 | Lee et al. |
| 2019/0053260 A1 | 2/2019 | Shaheen |
| 2020/0287665 A1* | 9/2020 | Lee ...................... H04L 1/1874 |
| 2020/0413397 A1* | 12/2020 | Blasco Serrano .... H04L 1/1812 |
| 2021/0376959 A1* | 12/2021 | Yang ...................... H04L 1/1896 |
| 2022/0046734 A1* | 2/2022 | Wang ...................... H04W 8/005 |

FOREIGN PATENT DOCUMENTS

| | | |
|---|---|---|
| CN | 108781159 | 11/2018 |
| CN | 109076578 A | 12/2018 |
| EP | 3016465 A1 | 5/2016 |
| JP | 2007318646 A | 12/2007 |
| WO | 2007088486 A2 | 8/2007 |
| WO | 2016163762 A1 | 10/2016 |
| WO | 2017052182 A1 | 3/2017 |
| WO | 2017/138796 A1 | 8/2017 |
| WO | 2017/171477 A1 | 10/2017 |
| WO | 2017/182068 A1 | 10/2017 |
| WO | 2017172538 A1 | 10/2017 |
| WO | 2017192025 A1 | 11/2017 |
| WO | 2018/071051 A1 | 4/2018 |

OTHER PUBLICATIONS

CMCC, "Discussion on HARQ feedback", 3GPP Draft; R1-1900405, 3rd Generation Partnership Project (3GPP), Mobile Competence Centre ; 650, Route Des Lucioles ; F-06921 Sophia-Antipolis Cedex ; France, vol. RAN WG1, No. Taipei; Jan. 21, 2019-Jan. 25, 2019, Jan. 20, 2019 (Jan. 20, 2019), XP51593234A; Retrieved from the Internet: URL:http://www.3gpp.org/ftp/Meetings5 F3GPP5FSYNC/RAN1/Docs/R12019004052Ezip [retrieved on Jan. 20, 2019].

CATT, "Discussion on physical layer structure in NR V2X", 3GPP Draft; R1-1900320, 3rd Generation Partnership Project (3GPP), Mobile Competence Centre ; 650, Route Des Lucioles ; F-06921 Sophia-Antipolis Cedex ; France, vol. RAN WG1, No. Taipei; Jan. 21, 2019-Jan. 25, 2019, Jan. 20, 2019 (Jan. 20, 2019), XP51593319A; Retrieved from the Internet: URL:http://www.3gpp.org/ftp/Meetings5F3GPP5FSYNC/RAN1/Docs/R12019003202Ezip [retrieved on Jan. 20, 2019].

Niranjan Kumar, "Office Action for IN Application No. 202137036714", dated Mar. 14, 2022, Intellectual Property India, India.

"36321_CR1017_(REL-14)_R2-1701650_introduction of LTE-based V2X Services" 3GPP TSG-RAN WG2_RL2 Feb. 8, 2017.

* cited by examiner

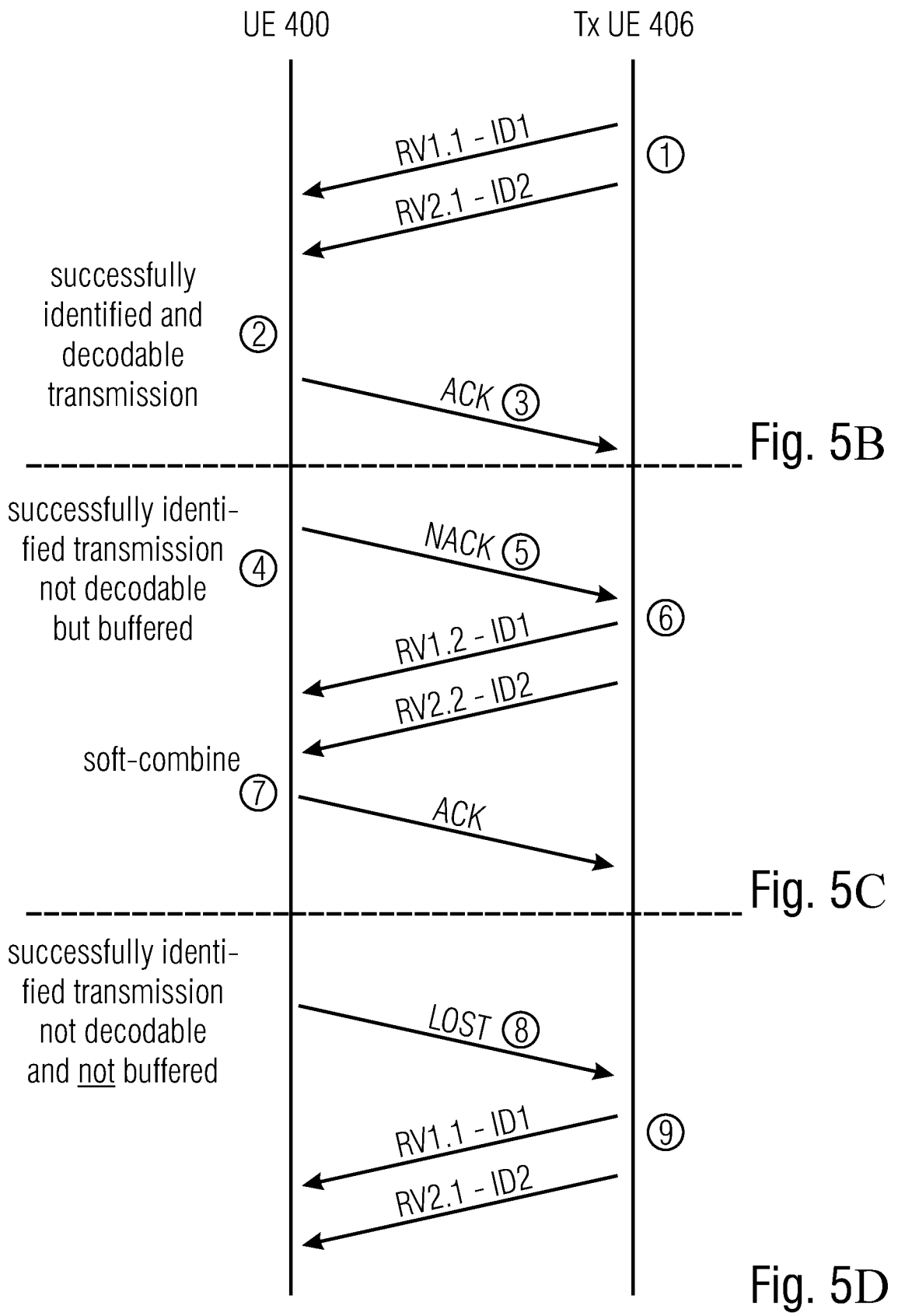

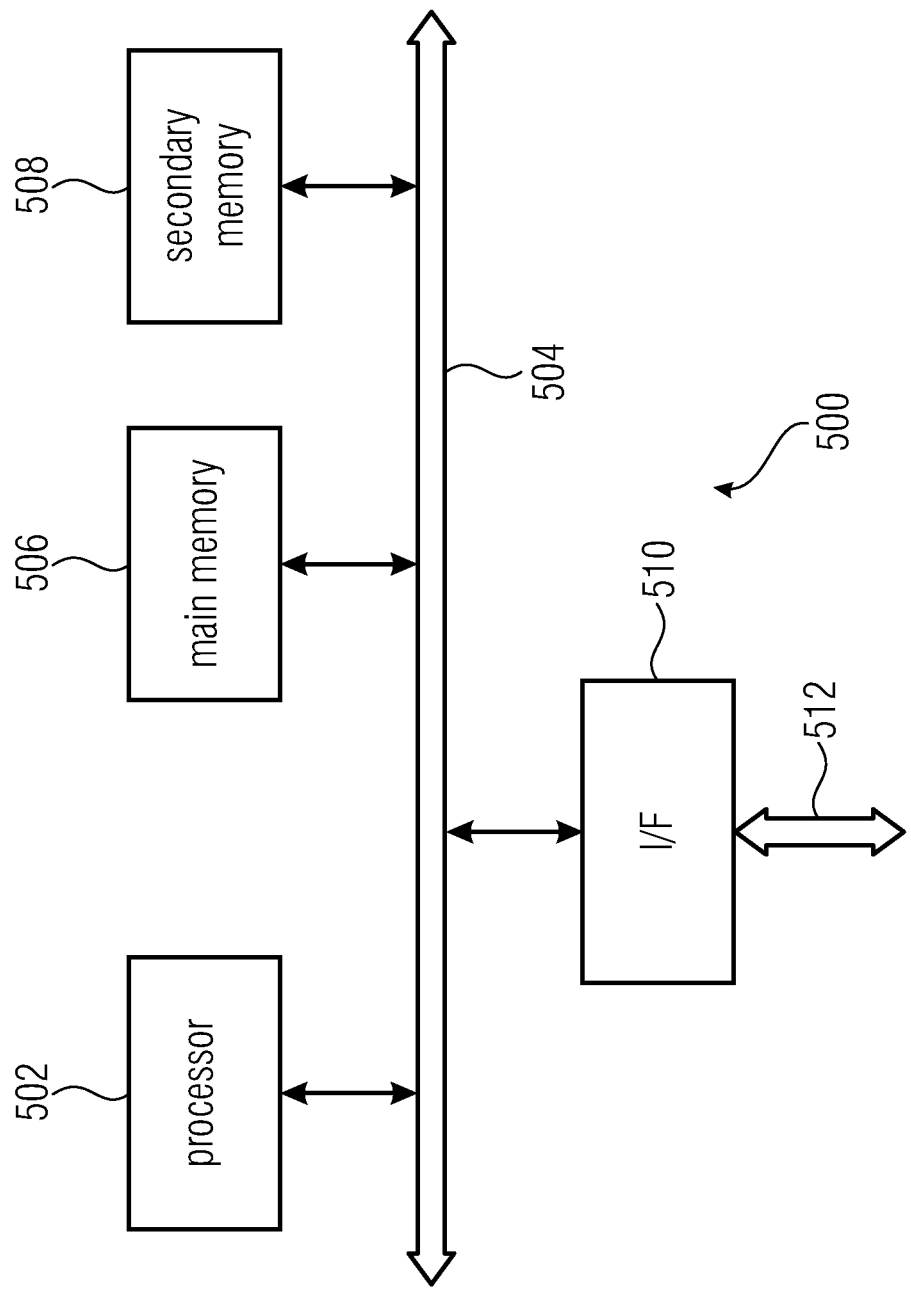

V2X HARQ PROCESS MANAGEMENT

CROSS-REFERENCE TO RELATED APPLICATIONS

This application is a continuation of copending International Application No. PCT/EP2020/053892, filed Feb. 14, 2020, which is incorporated herein by reference in its entirety, and additionally claims priority from European Application No. EP 19157565.3, filed Feb. 15, 2019, which is also incorporated herein by reference in its entirety.

The present application relates to the field of wireless communication systems or networks, more specifically to approaches for a wireless communication among user devices of a wireless communication system using a sidelink communication, like a V2X communication.

Embodiments concern improvements in the HARQ procedure associated with a communication over the sidelink.

BACKGROUND OF THE INVENTION

FIGS. 1A-1B are schematic representation of an example of a terrestrial wireless network 100 including, as is shown in FIG. 1A, a core network 102 and one or more radio access networks $RAN_1$, $RAN_2$, ... $RAN_N$. FIG. 1B is a schematic representation of an example of a radio access network $RAN_n$ that may include one or more base stations $gNB_1$ to $gNB_5$, each serving a specific area surrounding the base station schematically represented by respective cells $106_1$ to $106_5$. The base stations are provided to serve users within a cell. The term base station, BS, refers to a gNB in 5G networks, an eNB in UMTS/LTE/LTE-A/LTE-A Pro, or just a BS in other mobile communication standards. A user may be a stationary device or a mobile device. The wireless communication system may also be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items or devices having embedded therein electronics, software, sensors, actuators, or the like as well as network connectivity that enables these devices to collect and exchange data across an existing network infrastructure. FIG. 1B shows an exemplary view of five cells, however, the $RAN_n$ may include more or less such cells, and $RAN_n$ may also include only one base station. FIG. 1B shows two users $UE_1$ and $UE_2$, also referred to as user equipment, UE, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. Further, FIG. 1B shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base station $gNB_1$ to $gNB_5$ may be connected to the core network 102, e.g. via the S1 interface, via respective backhaul links $114_1$ to $114_5$, which are schematically represented in FIG. 1B by the arrows pointing to "core". The core network 102 may be connected to one or more external networks. Further, some or all of the respective base station $gNB_1$ to $gNB_5$ may connected, e.g. via the S1 or X2 interface or the XN interface in NR, with each other via respective backhaul links $116_1$ to $116_5$, which are schematically represented in FIG. 1B by the arrows pointing to "gNBs".

For data transmission a physical resource grid may be used. The physical resource grid may comprise a set of resource elements to which various physical channels and physical signals are mapped. For example, the physical channels may include the physical downlink, uplink and sidelink shared channels (PDSCH, PUSCH, PSSCH) carrying user specific data, also referred to as downlink, uplink and sidelink payload data, the physical broadcast channel (PBCH) carrying for example a master information block (MIB) and a system information block (SIB), the physical downlink, uplink and sidelink control channels (PDCCH, PUCCH, PSSCH) carrying for example the downlink control information (DCI), the uplink control information (UCI) and the sidelink control information (SCI). For the uplink, the physical channels may further include the physical random access channel (PRACH or RACH) used by UEs for accessing the network once a UE synchronized and obtained the MIB and SIB. The physical signals may comprise reference signals or symbols (RS), synchronization signals and the like. The resource grid may comprise a frame or radio frame having a certain duration in the time domain and having a given bandwidth in the frequency domain. The frame may have a certain number of subframes of a predefined length, e.g. 1 ms. Each subframe may include one or more slots of 12 or 14 OFDM symbols depending on the cyclic prefix (CP) length. A frame may also consist of a smaller number of OFDM symbols, e.g. when utilizing shortened transmission time intervals (sTTI) or a mini-slot/non-slot-based frame structure comprising just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard or the 5G or NR, New Radio, standard.

The wireless network or communication system depicted in FIG. 1 may by a heterogeneous network having distinct overlaid networks, e.g., a network of macro cells with each macro cell including a macro base station, like base station $gNB_1$ to $gNB_5$, and a network of small cell base stations (not shown in FIG. 1), like femto or pico base stations.

In addition to the above described terrestrial wireless network also non-terrestrial wireless communication networks exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-Advanced Pro standard or the 5G or NR, new radio, standard.

In mobile communication networks, for example in a network like that described above with reference to FIG. 1, like an LTE or 5G/NR network, there may be UEs that communicate directly with each other over one or more sidelink (SL) channels, e.g., using the PC5 interface. UEs that communicate directly with each other over the sidelink may include vehicles communicating directly with other vehicles (V2V communication), vehicles communicating with other entities of the wireless communication network (V2X communication), for example roadside entities, like traffic lights, traffic signs, or pedestrians. Other UEs may not be vehicular related UEs and may comprise any of the above-mentioned devices. Such devices may also communicate directly with each other (D2D communication) using the SL channels.

When considering two UEs directly communicating with each other over the sidelink, both UEs may be served by the same base station so that the base station may provide sidelink resource allocation configuration or assistance for the UEs. For example, both UEs may be within the coverage area of a base station, like one of the base stations depicted in FIG. 1. This is referred to as an "in-coverage" scenario. Another scenario is referred to as an "out-of-coverage" scenario. It is noted that "out-of-coverage" does not mean that the two UEs are not within one of the cells depicted in FIG. 1, rather, it means that these UEs

- may not be connected to a base station, for example, they are not in an RRC connected state, so that the UEs do not receive from the base station any sidelink resource allocation configuration or assistance, and/or
- may be connected to the base station, but, for one or more reasons, the base station may not provide sidelink resource allocation configuration or assistance for the UEs, and/or
- may be connected to the base station that may not support NR V2X services, e.g. GSM, UMTS, LTE base stations.

When considering two UEs directly communicating with each other over the sidelink, e.g. using the PC5 interface, one of the UEs may also be connected with a BS, and may relay information from the BS to the other UE via the sidelink interface. The relaying may be performed in the same frequency band (in-band-relay) or another frequency band (out-of-band relay) may be used. In the first case, communication on the Uu and on the sidelink may be decoupled using different time slots as in time division duplex, TDD, systems.

FIG. 2 is a schematic representation of an in-coverage scenario in which two UEs directly communicating with each other are both connected to a base station. The base station gNB has a coverage area that is schematically represented by the circle 200 which, basically, corresponds to the cell schematically represented in FIG. 1. The UEs directly communicating with each other include a first vehicle 202 and a second vehicle 204 both in the coverage area 200 of the base station gNB. Both vehicles 202, 204 are connected to the base station gNB and, in addition, they are connected directly with each other over the PC5 interface. The scheduling and/or interference management of the V2V traffic is assisted by the gNB via control signaling over the Uu interface, which is the radio interface between the base station and the UEs. In other words, the gNB provides SL resource allocation configuration or assistance for the UEs, and the gNB assigns the resources to be used for the V2V communication over the sidelink. This configuration is also referred to as a mode 1 configuration in NR V2X or as a mode 3 configuration in LTE V2X.

FIG. 3 is a schematic representation of an out-of-coverage scenario in which the UEs directly communicating with each other are either not connected to a base station, although they may be physically within a cell of a wireless communication network, or some or all of the UEs directly communicating with each other are to a base station but the base station does not provide for the SL resource allocation configuration or assistance. Three vehicles 206, 208 and 210 are shown directly communicating with each other over a sidelink, e.g., using the PC5 interface. The scheduling and/or interference management of the V2V traffic is based on algorithms implemented between the vehicles. This configuration is also referred to as a mode 2 configuration in NR V2X or as a mode 4 configuration in LTE V2X. As mentioned above, the scenario in FIG. 3 which is the out-of-coverage scenario does not necessarily mean that the respective mode 2 UEs (in NR) or mode 4 UEs (in LTE) are outside of the coverage 200 of a base station, rather, it means that the respective mode 2 UEs (in NR) or mode 4 UEs (in LTE) are not served by a base station, are not connected to the base station of the coverage area, or are connected to the base station but receive no SL resource allocation configuration or assistance from the base station. Thus, there may be situations in which, within the coverage area 200 shown in FIG. 2, in addition to the NR mode 1 or LTE mode 3 UEs 202, 204 also NR mode 2 or LTE mode 4 UEs 206, 208, 210 are present.

In the above-described scenarios of vehicular user devices, UEs, a plurality of such user devices may form a user device group, also referred to simply as group, and the communication within the group or among the group members may be performed via the sidelink interfaces between the user devices, like the PC5 interface. For example, the above-described scenarios using vehicular user devices may be employed in the field of the transport industry in which a plurality of vehicles being equipped with vehicular user devices may be grouped together, for example, by a remote driving application. Other use cases in which a plurality of user devices may be grouped together for a sidelink communication among each other include, for example, factory automation and electrical power distribution. In the case of factory automation, a plurality of mobile or stationary machines within a factory may be equipped with user devices and grouped together for a sidelink communication, for example for controlling the operation of the machine, like a motion control of a robot. In the case of electrical power distribution, entities within the power distribution grid may be equipped with respective user devices which, within a certain area of the system may be grouped together so as to communicate via a sidelink communication with each other so as to allow for monitoring the system and for dealing with power distribution grid failures and outages.

Naturally, in the above-mentioned use cases sidelink communication is not limited to a communication within a group. Rather, the sidelink communication may be among any of UEs, like any pair of UEs.

It is noted that the information in the above section is only for enhancing the understanding of the background of the invention and therefore it may contain information that does not form conventional technology that is already known to a person of ordinary skill in the art.

SUMMARY

An embodiment may have a user device, UE, for a wireless communication system, the wireless communication system including a plurality of user devices, UEs, wherein the UE is configured to communicate with one or more transmitting UEs using a sidelink, support a certain number of HARQ processes, and buffer one or more transmissions for each HARQ process, wherein, during a unicast communication with a transmitting UE using the sidelink, the UE is configured to receive from the transmitting UE a transmission during a transmission time interval, the transmission associated to control data, e.g. SCI, including a HARQ process ID, buffer the received transmission for the HARQ process, and combine the buffered transmissions prior to decoding, and wherein, in case a successfully identified transmission is not buffered, the UE is configured to indicate to the transmitting UE that the transmission is not buffered at the UE.

Another embodiment may have a user device, UE, for a wireless communication system, the wireless communication system including a plurality of user devices, UEs, wherein the UE is configured to communicate with one or more receiving UEs using a sidelink, and support a certain number of HARQ processes, wherein, during a unicast communication with a receiving UE using the sidelink, the UE is configured to transmit to the receiving UE a transmission during a transmission time interval, the transmission associated to control data, e.g. SCI, including a HARQ process ID, and receive a feedback from the receiving UE, and wherein the feedback includes an indication that a transmission a successfully identified by the receiving UE is not buffered at the receiving UE.

Another embodiment may have a user device, UE, for a wireless communication system, the wireless communication system including a plurality of user devices, UEs, wherein the UE is configured to communicate with one or more transmitting UEs using a sidelink, support a certain number of HARQ processes, and buffer one or more transmissions for each HARQ process, wherein, during a unicast communication with a transmitting UE using the sidelink, the UE is configured to receive from the transmitting UE a transmission during a transmission time interval, the transmission associated to control data, e.g. SCI, including a HARQ process ID, buffer the received transmission for the HARQ process, and combine the buffered transmissions prior to decoding, and wherein the UE is configured to report a buffer occupation to the transmitting UE using, e.g., L1 PSFCH signaling, so as to allow the transmitting UE to adapt a retransmission dependent on the buffer occupation of the UE.

Another embodiment may have a user device, UE, for a wireless communication system, the wireless communication system including a plurality of user devices, UEs, wherein the UE is configured to communicate with one or more receiving UEs using a sidelink, and support a certain number of HARQ processes, wherein, during a unicast communication with a receiving UE using the sidelink, the UE is configured to transmit to the receiving UE a transmission during a transmission time interval, the transmission associated to control data, e.g. SCI, including a HARQ process ID, and receive a feedback from the receiving UE, and wherein the UE is configured to receive from the receiving UE a buffer occupation report using, e.g., L1 PSFCH signaling, and to adapt a retransmission dependent on the buffer occupation of the receiving UE.

Another embodiment may have a user device, UE, for a wireless communication system, the wireless communication system including a plurality of user devices, UEs, wherein the UE is configured to communicate with one or more transmitting UEs using a sidelink, support a certain number of HARQ processes, and buffer one or more transmissions for each HARQ process, wherein, during a unicast communication with a transmitting UE using the sidelink, the UE is configured to receive from the transmitting UE a transmission during a transmission time interval, the transmission associated to control data, e.g. SCI, including a HARQ process ID, buffer the received transmission for the HARQ process, and combine the buffered transmissions prior to decoding, and wherein the UE is configured to negotiate with the transmitting UE the number of HARQ processes to be used for the unicast sidelink communication, or to receive from a base station of the wireless communication network a configuration message indicating the number of HARQ processes to be used for the unicast sidelink between the UE and the transmitting UE.

Another embodiment may have a user device, UE, for a wireless communication system, the wireless communication system including a plurality of user devices, UEs, wherein the UE is configured to communicate with one or more receiving UEs using a sidelink, and support a certain number of HARQ processes, wherein, during a unicast communication with a receiving UE using the sidelink, the UE is configured to transmit to the receiving UE a transmission during a transmission time interval, the transmission associated to control data, e.g. SCI, including a HARQ process ID, and receive a feedback from the receiving UE, and wherein the UE is configured to negotiate with the receiving UE the number of HARQ processes to be used for the unicast communication, or to receive from a base station of the wireless communication network a configuration message indicating the number of HARQ processes to be used for the unicast sidelink between the UE and the transmitting UE.

Another embodiment may have a wireless communication system, including a plurality of inventive user devices, UEs, and configured for a sidelink communication using resources from a set of sidelink resources of the wireless communication system.

According to another embodiment, a method for a sidelink communication between a receiving UE and a transmitting UE in a wireless communication system, the wireless communication system including a plurality of user devices, UEs, the sidelink communication supporting a certain number of HARQ processes, may have the steps of: receiving from the transmitting UE a transmission during a transmission time interval, the transmission associated to control data, e.g. SCI, including a HARQ process ID, buffering the received transmission for the HARQ process by the receiving UE, and combining the buffered transmissions prior to decoding by the receiving UE, wherein, in case a successfully identified transmission is not buffered, the receiving UE indicates to the transmitting UE that the transmission is not buffered at the UE.

According to another embodiment, a method for a sidelink communication between a receiving UE and a transmitting UE in a wireless communication system, the wireless communication system including a plurality of user devices, UEs, the sidelink communication supporting a certain number of HARQ processes may have the steps of: transmitting to the receiving UE a transmission during a transmission time interval, the transmission associated to control data, e.g. SCI, including a HARQ process ID, and receiving at the transmitting UE a feedback from the receiving UE, wherein the feedback includes an indication that a transmission a successfully identified by the receiving UE is not buffered at the receiving UE.

According to another embodiment, a method for a sidelink communication between a receiving UE and a transmitting UE in a wireless communication system, the wireless communication system including a plurality of user devices, UEs, the sidelink communication supporting a certain number of HARQ processes, may have the steps of:

receiving from the transmitting UE a transmission during a transmission time interval, the transmission associated to control data, e.g. SCI, including a HARQ process ID, buffering the received transmission for the HARQ process by the receiving UE, and combining the buffered transmissions prior to decoding by the receiving UE, wherein the UE reports a buffer occupation to the transmitting UE using, e.g., L PSFCH signaling, so as to allow the transmitting UE to adapt a retransmission dependent on the buffer occupation of the UE.

According to another embodiment, a method for a sidelink communication between a receiving UE and a transmitting UE in a wireless communication system, the wireless communication system including a plurality of user devices, UEs, the sidelink communication supporting a certain number of HARQ processes, may have the steps of: transmitting to the receiving UE a transmission during a transmission time interval, the transmission associated to control data, e.g. SCI, including a HARQ process ID, and receiving at the transmitting UE a feedback from the receiving UE, wherein the transmitting UE receives from the receiving UE a buffer occupation report using, e.g., L1 PSFCH signaling, and to adapt a retransmission dependent on the buffer occupation of the receiving UE.

According to another embodiment, a method for a sidelink communication between a receiving UE and a transmitting UE in a wireless communication system, the wireless communication system including a plurality of user devices, UEs, the sidelink communication supporting a certain number of HARQ processes, may have the steps of: receiving from the transmitting UE a transmission during a transmission time interval, the transmission associated to control data, e.g. SCI, including a HARQ process ID, buffering the received transmission for the HARQ process by the receiving UE, and combining the buffered transmissions prior to decoding by the receiving UE, wherein the receiving UE negotiates with the transmitting UE the number of HARQ processes to be used for the unicast sidelink communication, or wherein the number of HARQ processes to be used for the unicast sidelink between the receiving UE and the transmitting UE is provided a base station of the wireless communication network.

According to another embodiment, a method for a sidelink communication between a receiving UE and a transmitting UE in a wireless communication system, the wireless communication system including a plurality of user devices, UEs, the sidelink communication supporting a certain number of HARQ processes, may have the steps of: transmitting to the receiving UE a transmission during a transmission time interval, the transmission associated to control data, e.g. SCI, including a HARQ process ID, and receiving at the transmitting UE a feedback from the receiving UE, wherein the transmitting negotiates with the receiving UE the number of HARQ processes to be used for the unicast communication, or wherein the number of HARQ processes to be used for the unicast sidelink between the receiving UE and the transmitting UE is provided a base station of the wireless communication network.

Another embodiment may have a non-transitory digital storage medium having a computer program stored thereon to perform any of the inventive methods when said computer program is run by a computer.

BRIEF DESCRIPTION OF THE DRAWINGS

Embodiments of the present invention will be detailed subsequently referring to the appended drawings, in which:

FIG. 5B illustrates a successfully identified and decodable transmission from a transmitter UE to a receiver UE;

FIG. 5C illustrates a successfully identified but not decodable transmission from a transmitter UE that is buffered at a receiver UE;

FIG. 5D illustrates a successfully identified but not decodable transmission from a transmitter UE that not buffered at a receiver UE;

FIG. 10 illustrates an example of a computer system on which units or modules as well as the steps of the methods described in accordance with the inventive approach may execute.

DETAILED DESCRIPTION OF THE INVENTION

Figure 1A:
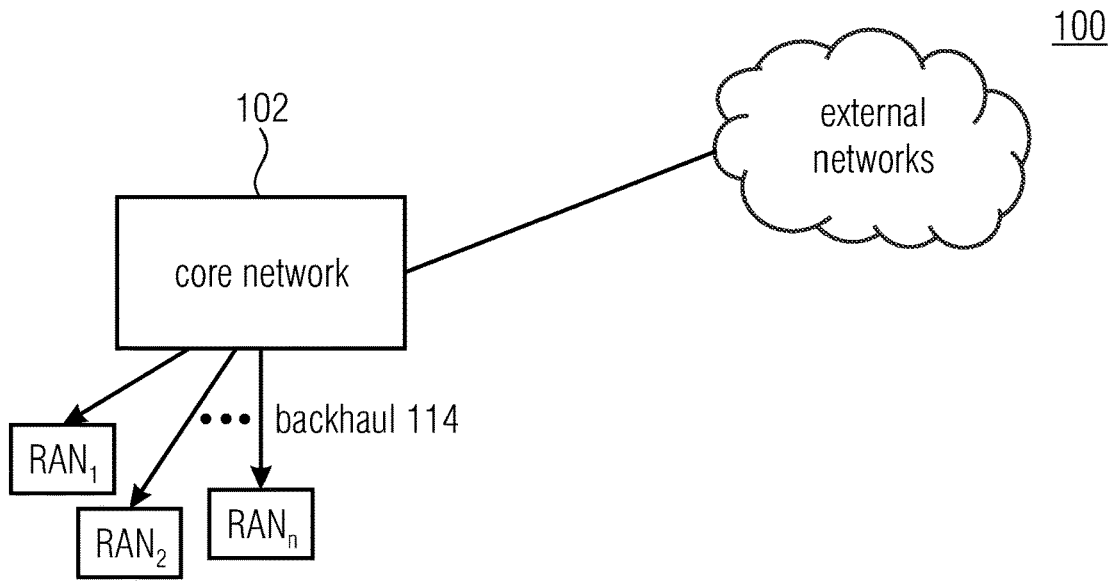
FIGS. 1A-1B show schematic representation of an example of a wireless communication system.
Figure 1B:
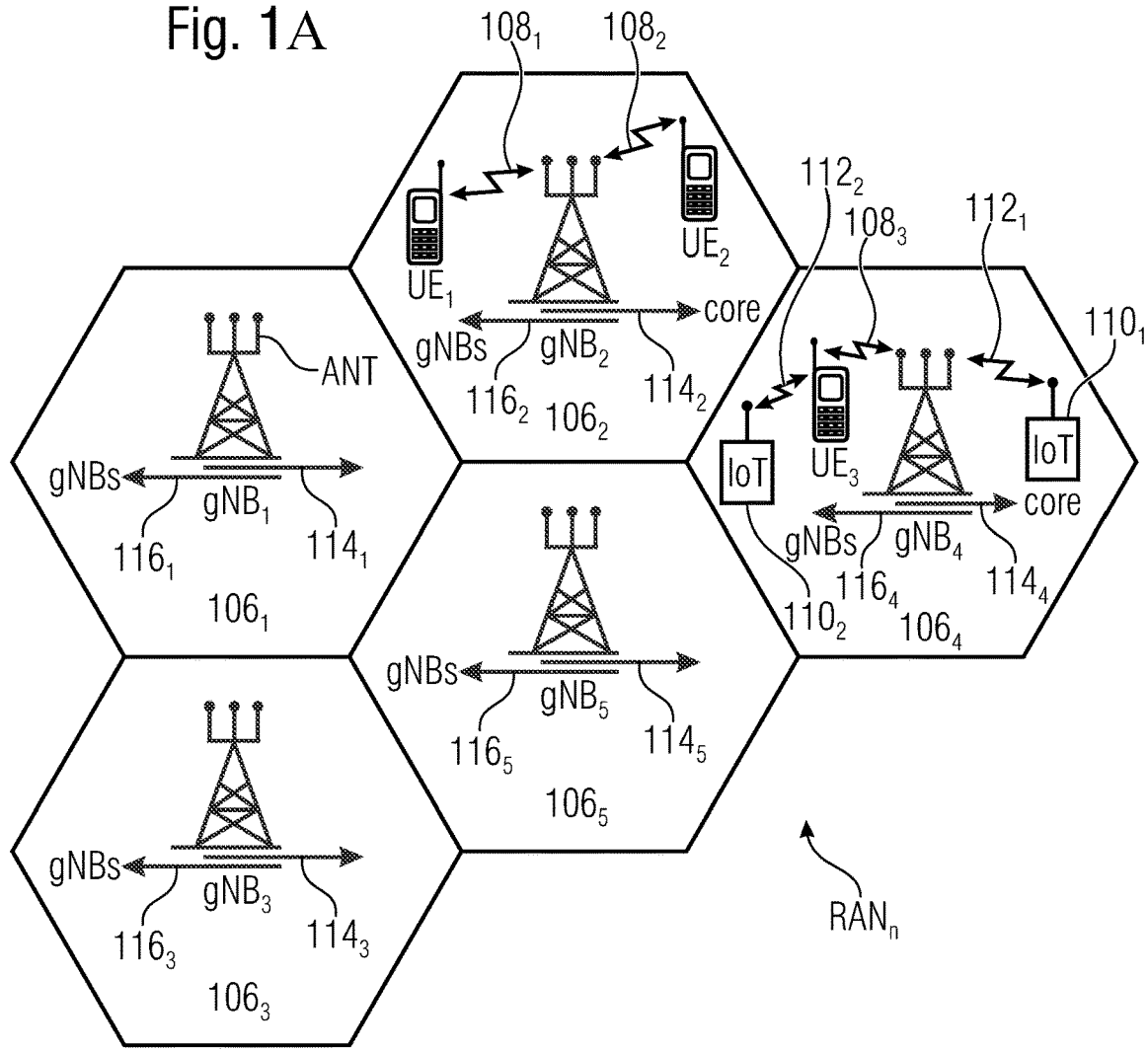
Figure 2:
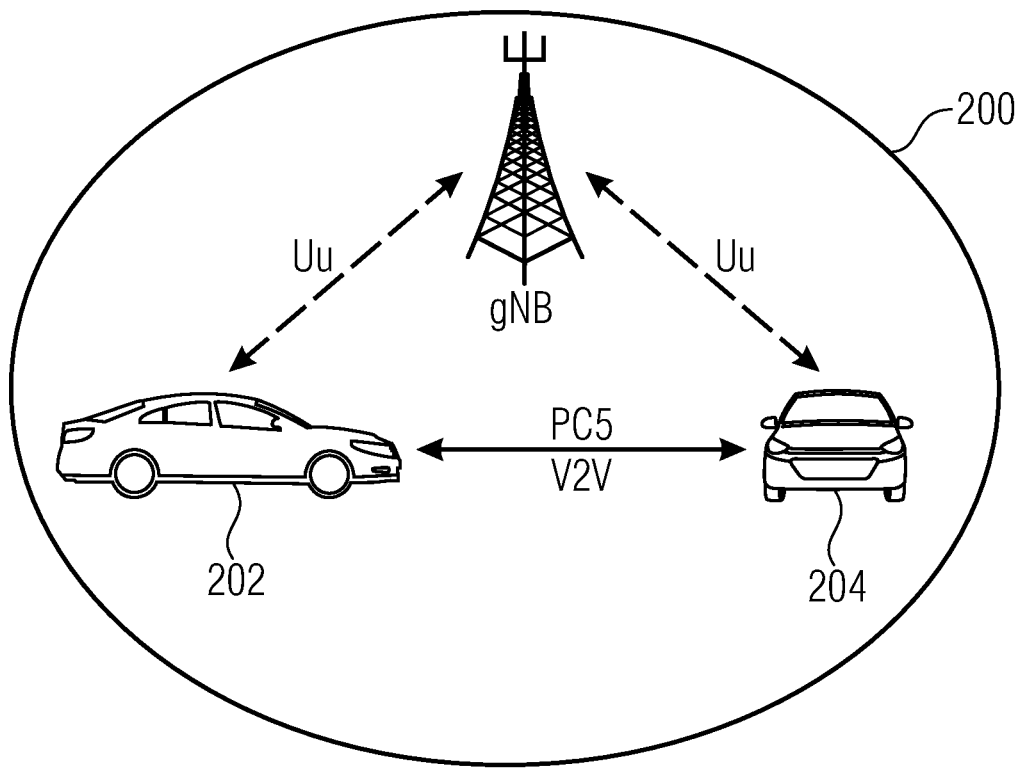
FIG. 2 is a schematic representation of an in-coverage scenario in which UEs directly communicating with each other are connected to a base station.
Figure 3:
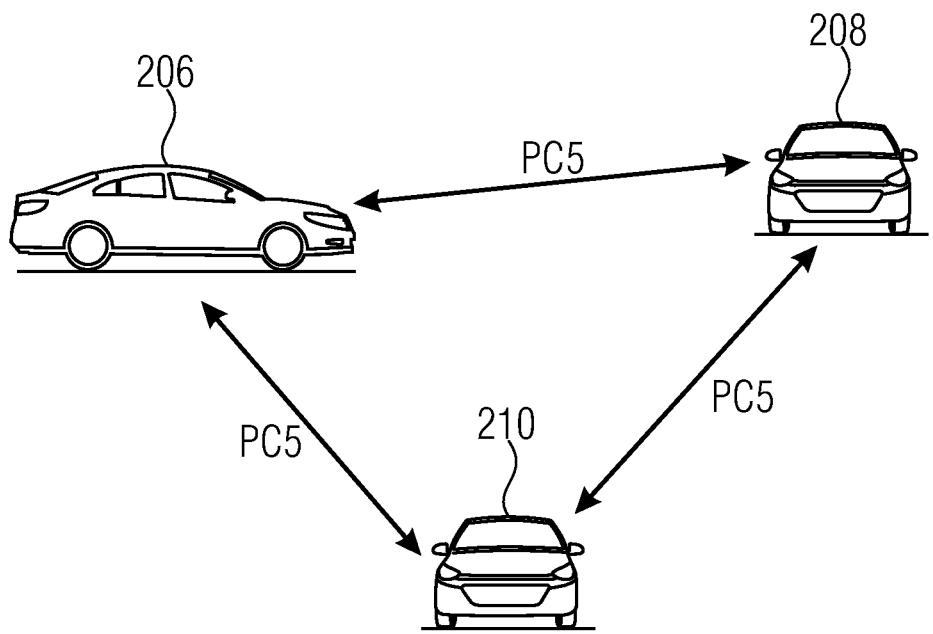
FIG. 3 is a schematic representation of an out-of-coverage scenario in which UEs directly communicating with each other receive no SL resource allocation configuration or assistance from a base station.

Embodiments of the present invention are now described in more detail with reference to the accompanying drawings in which the same or similar elements have the same reference signs assigned.

In wireless communication systems or networks like those described above with reference to FIGS. 1A-1B, FIG. 2 or FIG. 3, a sidelink communication among the respective user devices may be implemented, for example a vehicle-to-vehicle communication, V2V, a vehicle-to-anything communication, V2X, or any D2D communication among any other user devices, e.g., among those mentioned above. While in LTE V2V, V2X or D2D communications no feedback mechanism for transmissions from a transmitting or transmitter UE to a receiving or receiver UE via the sidelink is implemented, in NR V2X a feedback procedure, like the hybrid automatic repeat request, HARQ, procedure is introduced so as to enhance the reliability of communications over the sidelink, especially in case of a unicast communication in which a transmitter UE transmits to a dedicated receiver UE over a unicast sidelink. To assist the HARQ operation or procedure, a so-called HARQ process ID may be employed which, in case of a retransmission, links a transmission received at a receiver UE to previously receive transmissions so as to allow soft-combining all the transmissions before decoding.

When implementing a HARQ procedure for enhancing the reliability for a unicast communication over a sidelink from a transmitter UE to a receiver UE, which uses a HARQ process ID, the transmitter UE may assign a HARQ process ID to a transmission. The transmission may include the actual data to be transmitted, also referred to as the payload data, and control data, like the SCI, including the HARQ process ID associated with the transmission. For example, when assuming that a control data or message, like the sidelink control information, SCI, allows two bits for indicating the HARQ process ID, the transmitter UE may transmit up to four transmissions in parallel during a transmission time interval, like a TTI or sTTI, and each transmission is associated with a respective different HARQ process ID. Based on the HARQ process ID, the receiver UE, which provides buffer space, like a soft buffer, for buffering transmissions from transmitter UEs, knows into which buffer to put the received transmissions. Further, besides the HARQ process ID also an indicator may be included in the control data, like a new data indicator, NDI, which, when being the same as in a preceding transmission indicates that the current transmission is linked to the preceding transmission. When the new data indicator is toggled, i.e., when the indicator value changed when compared to a preceding transmission, this means that the current transmission and the preceding transmission are not linked which causes the receiver UE to flush its buffer associated with the HARQ process ID before the current transmission is stored or buffered. In case the transmissions are linked, the current and previous transmissions buffered by the receiver UE may be soft-combined so as to enhance the decodability thereof. The number of HARQ processes may be hardware limited, for example, by a decoder architecture, an available amount of storage or memory for the buffer, also referred to as the soft buffer size.

The concept of HARQ process IDs is employed for HARQ procedures on the uU interface, i.e., for HARQ procedures for downlink/uplink communications between a user device and a gNB or base station in a wireless communication network. In such a scenario, the base station has knowledge about the uplink/downlink transmissions between the base station and the respective UEs and configures the UEs to provide sufficient buffer for buffering transmissions for each of the HARQ processes occurring over the uplink/downlink communications. In other words, in non-sidelink scenarios the base station is aware of the traffic and the buffer space needed in the UEs so that the HARQ procedure can be controlled in such a way that for any transmission buffer space is available, i.e., a buffer overflow will not occur.

Contrary thereto, in sidelink scenarios the transmitter UE has no knowledge about the number of HARQ processes the receiver UE has to manage and how many of the available HARQ processes at the receiver UE are already occupied by other UEs performing a unicast communication with the receiver UE. In such a situation, it may happen that the receiver UE does not have a sufficient number of HARQ processes for a new incoming transmission so that the transmission is not buffered at the receiver UE. The receiver UE reports a non-successful transmission back to the transmitter UE, for example, by reporting a NACK message.

The NACK message, however, causes the transmitter UE to assume that the receiver UE was able to decode the control data associated with the transmission, but the actual transmission or data was not decodable by the receiver UE, e.g. due to the channel conditions, and that the transmission or data, therefore, is buffered by the receiver UE for later use. The situation that the receiver UE can decode the control message, which includes the HARQ process ID, but cannot decode the actual transmission or data may also be referred to in the following as a successfully identified transmission.

In accordance with the conventionally implemented HARQ procedure, the transmitter UE receiving the NACK sends a retransmission, like a next redundancy version RV of the transmission. However, in case the preceding redundancy version or preceding transmission is not buffered by the receiver UE, without the initial redundancy version in the buffer, any following redundancy version on its own has a degraded decoding performance effecting the total transmission reliability leading to a communication which may no longer fulfill a required quality of services, QoS associated with the transmission from the transmitter UE to the receiver UE using the unicast sidelink communication.

The present invention addresses the above issues by providing improvements in the handling of feedback on the sidelink allowing a transmitter UE to recognize that a current transmission, although being successfully identified at the receiver UE, was not buffered, i.e., was lost, and/or avoiding or reducing the likelihood of soft buffer overflows at the receiver UE.

Figure 4:
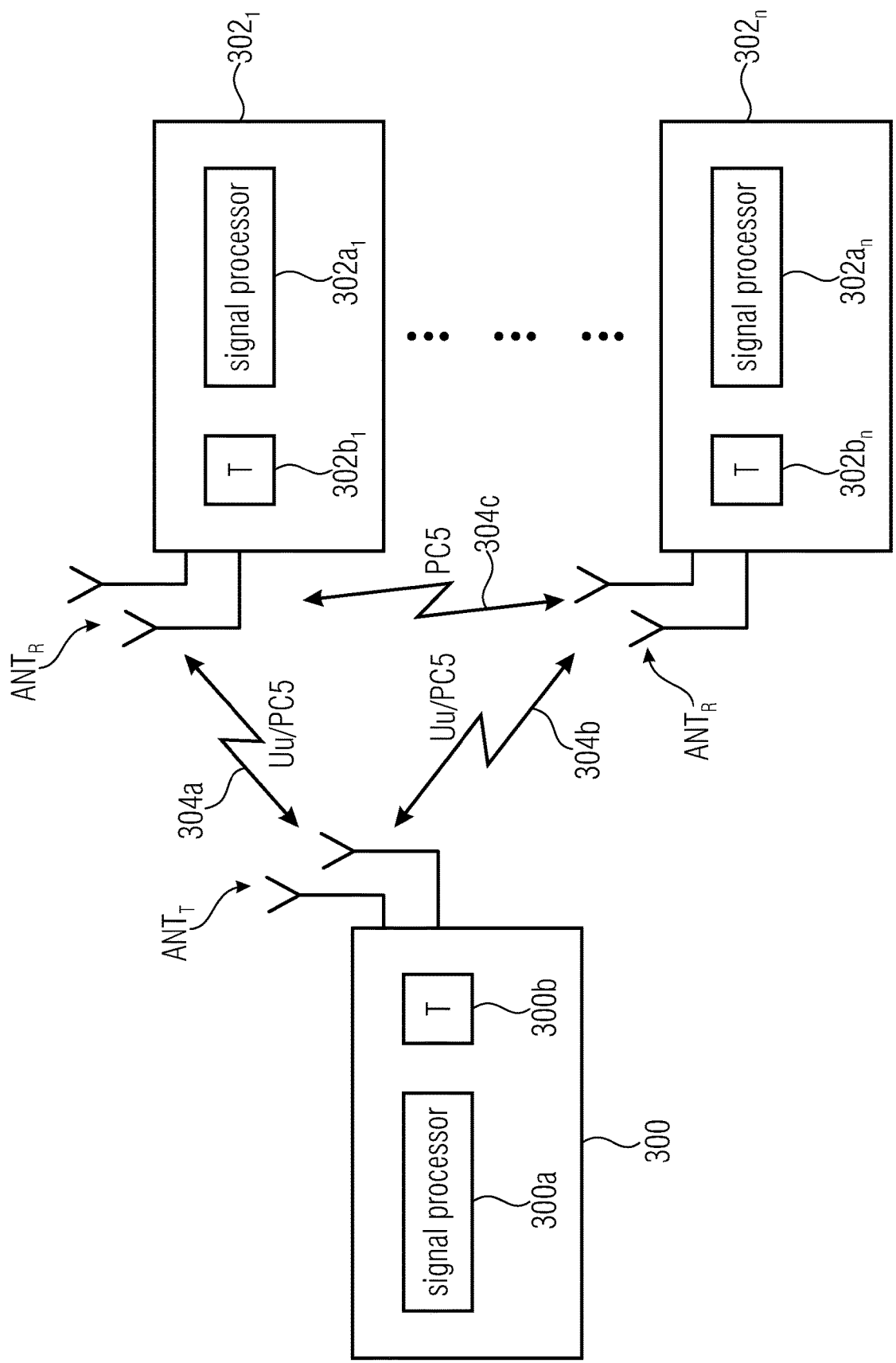
FIG. 4 is a schematic representation of a wireless communication system including a transmitter, like a base station, and one or more receivers, like user devices, UEs.

Embodiments of the present invention may be implemented in a wireless communication system as depicted in FIGS. 1A-1B, FIG. 2, and FIG. 3 including base stations and users, like mobile terminals or IoT devices. FIG. 4 is a schematic representation of a wireless communication system including a transmitter 300, like a base station, and one or more receivers $302_1$ to $302_n$, like user devices, UEs. The transmitter 300 and the receivers 302 may communicate via one or more wireless communication links or channels 304a, 304b, 304c, like a radio link. The transmitter 300 may include one or more antennas $ANT_T$ or an antenna array having a plurality of antenna elements, a signal processor 300a and a transceiver 300b, coupled with each other. The receivers 302 include one or more antennas $ANT_R$ or an antenna array having a plurality of antennas, a signal processor $302a_1$, $302a_n$, and a transceiver $302b_1$, $302b_n$ coupled with each other. The base station 300 and the UEs 302 may communicate via respective first wireless communication links 304a and 304b, like a radio link using the Uu interface, while the UEs 302 may communicate with each other via a second wireless communication link 304c, like a radio link using the PC5 interface. When the UEs are not served by the base station, are not be connected to a base station, for example, they are not in an RRC connected state, or, more generally, when no SL resource allocation configuration or assistance is provided by a base station, the UEs may communicate with each other over the sidelink. The system, the one or more UEs 302 and the base stations may operate in accordance with the inventive teachings described herein.

User Devices

1$^{st}$ Aspect—Receiver UE

The present invention provides (see for example claim 1) a user device, UE, for a wireless communication system, the wireless communication system including a plurality of user devices, UEs, wherein the UE is configured to
communicate with one or more transmitting UEs using a sidelink,
support a certain number of HARQ processes, and
buffer one or more transmissions for each HARQ process,
wherein, during a unicast communication with a transmitting UE using the sidelink, the UE is configured to receive from the transmitting UE a transmission during a transmission time interval, the transmission associated to control data, e.g. SCI, including a HARQ process ID,
buffer the received transmission for the HARQ process, and
combine the buffered transmissions prior to decoding, and
wherein, in case a successfully identified transmission is not buffered, the UE is configured to indicate to the transmitting UE that the transmission is not buffered at the UE.

In accordance with embodiments (see for example claim 2), the UE is configured to signal
   a first state indicating a successful transmission over the sidelink, e.g., an ACK state, so as to enable the transmitting UE to perform a new transmission,
   a second state indicating a non-successful transmission over the sidelink, e.g., a NACK state, so as to request a retransmission from the transmitting UE, and
   a third state indicating that a successfully identified transmission over the sidelink is not buffered by the receiving UE, e.g., a LOST state, and
wherein the first, second and third states are different.

In accordance with embodiments (see for example claim 3), the UE is configured to signal
   the first state using a base sequence with a first cyclic shift or phase rotation,
   the second state using the base sequence with a second cyclic shift or phase rotation, and
   the third state using the base sequence with a third cyclic shift or phase rotation, and
wherein the first, second and third cyclic shifts or phase rotations are different.

In accordance with embodiments (see for example claim 4), the first cyclic shift or phase rotation is 0, the second cyclic shift or phase rotation is 2n/3, and the third cyclic shift or phase rotation is 4n/3.

In accordance with embodiments (see for example claim 5), the UE is configured to signal
   the first state using a base sequence with a first cyclic shift or phase rotation,
   the second state using the base sequence with a second cyclic shift or phase rotation,
   the third state by not transmitting the base sequence, and
wherein the first and second cyclic shifts or phase rotations are different.

In accordance with embodiments (see for example claim 6), the first cyclic shift or phase rotation is 0, and the second cyclic shift or phase rotation is n.

In accordance with embodiments (see for example claim 7), the UE is configured to signal a message including a plurality of bits, wherein
   the first state is indicated by a first combination of the plurality of bits,
   the second state is indicated by a second combination of the plurality of bits, and
   the third state is indicated by a third combination of the plurality of bits, and
wherein the first, second and third combinations are different.

In accordance with embodiments (see for example claim 8), the first combination is 00, the second combination is 10, and the third combination is 11.

1$^{st}$ Aspect—Transmitter UE

The present invention provides (see for example claim 9) a user device, UE, for a wireless communication system, the wireless communication system including a plurality of user devices, UEs,
wherein the UE is configured to
   communicate with one or more receiving UEs using a sidelink, and
   support a certain number of HARQ processes,
wherein, during a unicast communication with a receiving UE using the sidelink, the UE is configured to
   transmit to the receiving UE a transmission during a transmission time interval, the transmission associated to control data, e.g. SCI, including a HARQ process ID, and
   receive a feedback from the receiving UE, and
wherein the feedback comprises an indication that a transmission a successfully identified by the receiving UE is not buffered at the receiving UE.

In accordance with embodiments (see for example claim 10), the feedback comprises
   a first state indicating a successful transmission over the sidelink, e.g., an ACK state,
   a second state indicating a non-successful transmission over the sidelink, e.g., a NACK state, and the UE is configured to perform a retransmission responsive to the second state, and
   a third state indicating that a successfully identified transmission over the sidelink is not buffered by the receiver UE, e.g., a LOST state, and
wherein the first, second and third states are different.

In accordance with embodiments (see for example claim 11), responsive to the feedback that the transmission is not buffered at the receiving UE, the UE is configured to cause one or more of the following actions:
   drop the transmission and/or back-off for a predefined time,
   overwrite an already occupied HARQ process,
   retransmit the same transmission,
   causing the receiving UE to switch from Incremental Redundancy to Chase Combining.

In accordance with embodiments (see for example claim 12), the UE is configured to decide the action dependent on one or more of:
   a QoS of the transmission associated with the non-buffered transmission,
   a QoS of the transmissions already in the HARQ processes,
   a number of retransmissions.

In accordance with embodiments (see for example claim 13),
   if the non-buffered transmission has a lower QoS compared to other transmissions already in the active HARQ processes, the UE is configured to drop the transmission and/or to back-off for some time,
   if the non-buffered transmission has a higher QoS compared to the transmissions already in the active HARQ processes, the UE is configured to transmit the high QoS transmission with a HARQ process ID which is already occupied by another transmission, and cause the receiving UE to flush the buffer associated with the HARQ process ID, e.g., by toggling the NDI, and to save the new transmission,
   in case Incremental Redundancy HARQ is used and the non-buffered transmission is not the initial transmission, the UE is configured to change to Chase Combining and to retransmit a transmission already sent and for which a successful buffering but failed decoding was signaled.

2nd Aspect—Receiver UE

The present invention provides (see for example claim 14) a user device, UE, for a wireless communication system, the wireless communication system including a plurality of user devices, UEs,
wherein the UE is configured to
communicate with one or more transmitting UEs using a sidelink,
support a certain number of HARQ processes, and
buffer one or more transmissions for each HARQ process, wherein, during a unicast communication with a transmitting UE using the sidelink, the UE is configured to
receive from the transmitting UE a transmission during a transmission time interval, the transmission associated to control data, e.g. SCI, including a HARQ process ID,
buffer the received transmission for the HARQ process, and
combine the buffered transmissions prior to decoding, and
wherein the UE is configured to report a buffer occupation to the transmitting UE using, e.g., L1 PSFCH signaling, so as to allow the transmitting UE to adapt a retransmission dependent on the buffer occupation of the UE.

In accordance with embodiments (see for example claim 15), the UE is configured to
signal to the transmitting UE that using more HARQ processes is possible, in case the buffer occupation is in a first state, like a low buffer occupation state,
signal to the transmitting UE to maintain the currently used number of HARQ processes, in case the buffer occupation is in a second state, like a medium buffer occupation state,
signal to the transmitting UE to reduce the number of HARQ processes used possible, in case the buffer occupation is in a third state, like a high buffer occupation state.

In accordance with embodiments (see for example claim 16), wherein the UE is configured to use a fixed number of HARQ processes for each unicast sidelink, or fixed total number of HARQ processes for all sidelinks.

In accordance with embodiments (see for example claim 17), the UE is configured to receive a control message, like a SCI, the control message including a number of bits for signaling a HARQ process ID associated with a HARQ process, and wherein the fixed number of HARQ processes is defined, e.g., by a mobile communication standard, or is preconfigured, e.g., during connection of the UE to the wireless communication system or during setup of the sidelink communication.

2nd Aspect—Transmitter UE

The present invention provides (see for example claim 18) a user device, UE, for a wireless communication system, the wireless communication system including a plurality of user devices, UEs,
wherein the UE is configured to
communicate with one or more receiving UEs using a sidelink, and
support a certain number of HARQ processes,
wherein, during a unicast communication with a receiving UE using the sidelink, the UE is configured to
transmit to the receiving UE a transmission during a transmission time interval, the transmission associated to control data, e.g. SCI, including a HARQ process ID, and
receive a feedback from the receiving UE, and
wherein the UE is configured to receive from the receiving UE a buffer occupation report using, e.g., L1 PSFCH signaling, and to adapt a retransmission dependent on the buffer occupation of the receiving UE.

In accordance with embodiments (see for example claim 19), the UE is configured to
increase the currently used number of HARQ processes, responsive to a report from the receiving UE indicating that the buffer occupation is in a first state, like a low buffer occupation state,
maintain the currently used number of HARQ processes, responsive to a report from the receiving UE indicating that the buffer occupation is in a second state, like a medium buffer occupation state,
reduce the currently used number of HARQ processes, responsive to a report from the receiving UE indicating that the buffer occupation is in a third state, like a high buffer occupation state.

In accordance with embodiments (see for example claim 20), the UE is configured to use a fixed number of HARQ processes for each unicast sidelink, or fixed total number of HARQ processes for all sidelinks.

3rd Aspect—Receiver UE

The present invention provides (see for example claim 21) a user device, UE, for a wireless communication system, the wireless communication system including a plurality of user devices, UEs,
wherein the UE is configured to
communicate with one or more transmitting UEs using a sidelink,
support a certain number of HARQ processes, and
buffer one or more transmissions for each HARQ process, wherein, during a unicast communication with a transmitting UE using the sidelink, the UE is configured to
receive from the transmitting UE a transmission during a transmission time interval, the transmission associated to control data, e.g. SCI, including a HARQ process ID,
buffer the received transmission for the HARQ process, and
combine the buffered transmissions prior to decoding, and
wherein the UE is configured to negotiate with the transmitting UE the number of HARQ processes to be used for the unicast sidelink communication, or to receive from a base station of the wireless communication network a configuration message indicating the number of HARQ processes to be used for the unicast sidelink between the UE and the transmitting UE.

In accordance with embodiments (see for example claim 22), the UE is configured to
receive from the transmitting UE a signaling over the sidelink, e.g., an RRC connection setup or an RRC reconfiguration, an indication of the number of HARQ processes the transmitting UE plans to use for the current unicast sidelink with the UE, and
confirm the indicated number of HARQ processes or indicate a number which is smaller from the number of HARQ processes proposed by the transmitting UE,
wherein the UE and the transmitting UE reserve the agreed number of HARQ processes for the current unicast sidelink.

In accordance with embodiments (see for example claim 23), the UE is configured to report a number of available HARQ processes to the transmitting UE, so as to allow the transmitting UE to choose a number of HARQ processes to be used equal to or less than the number of available HARQ processes indicated by the UE.

In accordance with embodiments (see for example claim 24), the UE is configured to receive from the transmitting UE a confirmation of the number of HARQ processes chosen by the transmitting UE.

In accordance with embodiments (see for example claim 25), the UE is configured to
  receive, after setting up the unicast sidelink, a request from the transmitting UE for more HARQ processes, and
  in case the UE has unallocated buffer, signal to the transmitting UE how many HARQ processes the UE is able to support.

In accordance with embodiments (see for example claim 26), the UE is configured to
  receive, after setting up the unicast sidelink, an indication from the transmitting UE that less HARQ processes are required, and
  free allocated buffer.

3$^{rd}$ Aspect—Transmitter UE

The present invention provides (see for example claim 27) a user device, UE, for a wireless communication system, the wireless communication system including a plurality of user devices, UEs,
wherein the UE is configured to
  communicate with one or more receiving UEs using a sidelink, and
  support a certain number of HARQ processes,
wherein, during a unicast communication with a receiving UE using the sidelink, the UE is configured to
  transmit to the receiving UE a transmission during a transmission time interval, the transmission associated to control data, e.g. SCI, including a HARQ process ID, and
  receive a feedback from the receiving UE, and
wherein the UE is configured to negotiate with the receiving UE the number of HARQ processes to be used for the unicast communication, or to receive from a base station of the wireless communication network a configuration message indicating the number of HARQ processes to be used for the unicast sidelink between the UE and the transmitting UE.

In accordance with embodiments (see for example claim 28), the UE is configured to
  transmit to the receiving UE, e.g., using an RRC configuration procedure over the sidelink, an indication of the number of HARQ processes the UE plans to use for the current unicast sidelink with the receiving UE, and
  receive from the receiving UE a confirmation of the indicated number of HARQ processes or an indication of a number which is smaller from the number of HARQ processes proposed by the UE, and
wherein the UE and the receiving UE reserve the agreed number of HARQ processes for the current unicast sidelink.

In accordance with embodiments (see for example claim 29), the UE is configured to receive a report of a number of available HARQ processes at the receiving UE, and to choose a number of HARQ processes to be used equal to or less than the number of available HARQ processes indicated by the receiving UE.

In accordance with embodiments (see for example claim 30), the UE is configured to transmit to the receiving UE a confirmation of the number of HARQ processes chosen by the UE.

In accordance with embodiments (see for example claim 31), the UE is configured to
  transmit, after setting up the unicast sidelink, a request to the receiving UE for more HARQ processes, and
  receive form the receiving UE how many HARQ processes the receiving UE is able to support, in case the UE has unallocated buffer.

In accordance with embodiments (see for example claim 32), the UE is configured to transmit, after setting up the unicast sidelink, an indication to the receiving UE that less HARQ processes are required, so as to allow the receiving UE to free allocated buffer.

In accordance with embodiments (see for example claim 33), the UE is configured to derive a size of a HARQ process ID field in an control message on the sidelink, like a SCI, from the agreed number of HARQ processes, e.g., 4 HARQ processes→2 bits, 3 HARQ processes→2 bits, 8 HARQ processes→3 bits.

In accordance with embodiments (see for example claim 34), in case the receiving UE and the transmitting UE are configured with a number of HARQ processes in one direction for the unicast sidelink from the transmitting UE to the receiving UE, the same number of HARQ processes is applied for a unicast sidelink from the receiving UE to the transmitting UE, for example in case the traffic in both directions is substantially symmetrical.

General

In accordance with embodiments (see for example claim 35), the transmitting UE is configured to perform a plurality of transmissions in parallel during a transmission time interval, each of the transmissions including a HARQ process ID.

In accordance with embodiments (see for example claim 36), the UE comprise one or more of a mobile terminal, or stationary terminal, or cellular IoT-UE, or vehicular UE, or vehicular group leader (GL) UE, or an IoT or narrowband IoT, NB-IoT, device, or a ground based vehicle, or an aerial vehicle, or a drone, or a moving base station, or road side unit, or a building, or any other item or device provided with network connectivity enabling the item/device to communicate using the wireless communication network, e.g., a sensor or actuator.

System

The present invention provides (see for example claim 37) a wireless communication system, comprising a plurality of user devices, UEs, according to the present invention and configured for a sidelink communication using resources from a set of sidelink resources of the wireless communication system.

In accordance with embodiments (see for example claim 38), the base station comprises one or more of a macro cell base station, or a small cell base station, or a central unit of a base station, or—a distributed unit of a base station, or a road side unit, or a UE, or a group leader (GL), or a relay, or a remote radio head, or an AMF, or an SMF, or a core network entity, or mobile edge computing entity, or a network slice as in the NR or 5G core context, or any transmission/reception point, TRP, enabling an item or a device to communicate using the wireless communication network, the item or device being provided with network connectivity to communicate using the wireless communication network.

Methods

1$^{st}$ Aspect—Receiver UE

The present invention provides (see for example claim 39) a method for a sidelink communication between a receiving UE and a transmitting UE in a wireless communication system, the wireless communication system including a plurality of user devices, UEs, the sidelink communication supporting a certain number of HARQ processes, the method comprising:

receiving from the transmitting UE a transmission during a transmission time interval, the transmission associated to control data, e.g. SCI, including a HARQ process ID, buffering the received transmission for the HARQ process by the receiving UE, and combining the buffered transmissions prior to decoding by the receiving UE, wherein, in case a successfully identified transmission is not buffered, the receiving UE indicates to the transmitting UE that the transmission is not buffered at the UE.

$1^{st}$ Aspect—Transmitter UE

The present invention provides (see for example claim 40) a method for a sidelink communication between a receiving UE and a transmitting UE in a wireless communication system, the wireless communication system including a plurality of user devices, UEs, the sidelink communication supporting a certain number of HARQ processes, the method comprising:

transmitting to the receiving UE a transmission during a transmission time interval, the transmission associated to control data, e.g. SCI, including a HARQ process ID, and receiving at the transmitting UE a feedback from the receiving UE, wherein the feedback comprises an indication that a transmission a successfully identified by the receiving UE is not buffered at the receiving UE.

$2^{nd}$ Aspect—Receiver UE

The present invention provides (see for example claim 41) a method for a sidelink communication between a receiving UE and a transmitting UE in a wireless communication system, the wireless communication system including a plurality of user devices, UEs, the sidelink communication supporting a certain number of HARQ processes, the method comprising:

receiving from the transmitting UE a transmission during a transmission time interval, the transmission associated to control data, e.g. SCI, including a HARQ process ID, buffering the received transmission for the HARQ process by the receiving UE, and combining the buffered transmissions prior to decoding by the receiving UE, wherein the UE reports a buffer occupation to the transmitting UE using, e.g., L1 PSFCH signaling, so as to allow the transmitting UE to adapt a retransmission dependent on the buffer occupation of the UE.

$2^{nd}$ Aspect—Transmitter UE

The present invention provides (see for example claim 42) a method for a sidelink communication between a receiving UE and a transmitting UE in a wireless communication system, the wireless communication system including a plurality of user devices, UEs, the sidelink communication supporting a certain number of HARQ processes, the method comprising:

transmitting to the receiving UE a transmission during a transmission time interval, the transmission associated to control data, e.g. SCI, including a HARQ process ID, and receiving at the transmitting UE a feedback from the receiving UE, wherein the transmitting UE receives from the receiving UE a buffer occupation report using, e.g., L1 PSFCH signaling, and to adapt a retransmission dependent on the buffer occupation of the receiving UE.

$3^{nd}$ Aspect—Receiver UE

The present invention provides (see for example claim 43) a method for a sidelink communication between a receiving UE and a transmitting UE in a wireless communication system, the wireless communication system including a plurality of user devices, UEs, the sidelink communication supporting a certain number of HARQ processes, the method comprising:

receiving from the transmitting UE a transmission during a transmission time interval, the transmission associated to control data, e.g. SCI, including a HARQ process ID, buffering the received transmission for the HARQ process by the receiving UE, and combining the buffered transmissions prior to decoding by the receiving UE, wherein the receiving UE negotiates with the transmitting UE the number of HARQ processes to be used for the unicast sidelink communication, or wherein the number of HARQ processes to be used for the unicast sidelink between the receiving UE and the transmitting UE is provided a base station of the wireless communication network.

$3^{rd}$ Aspect—Transmitter UE

The present invention provides (see for example claim 44) a method for a sidelink communication between a receiving UE and a transmitting UE in a wireless communication system, the wireless communication system including a plurality of user devices, UEs, the sidelink communication supporting a certain number of HARQ processes, the method comprising:

transmitting to the receiving UE a transmission during a transmission time interval, the transmission associated to control data, e.g. SCI, including a HARQ process ID, and receiving at the transmitting UE a feedback from the receiving UE, wherein the transmitting negotiates with the receiving UE the number of HARQ processes to be used for the unicast communication, or wherein the number of HARQ processes to be used for the unicast sidelink between the receiving UE and the transmitting UE is provided a base station of the wireless communication network.

Computer Program Product

The present invention provides a computer program product comprising instructions which, when the program is executed by a computer, causes the computer to carry out one or more methods in accordance with the present invention.

Thus, the present invention improvements in the communication over the sidelink with or within a group of user devices.

$1^{st}$ Aspect

In accordance with embodiments of a first aspect of the present invention, the use of an additional HARQ state, in addition to the acknowledgment state and the non-acknowledgement state, is suggested. This additional state, which may be referred to as a LOST state, may be used so as to signal to a transmitter UE that a current transmission over a unicast sidelink to the receiver UE us successfully identified at the receiver UE but not buffered there. For example, for the current transmission the receiver UE can decode the control message (successfully identify the transmission for the receiver UE), which includes the HARQ process ID, but is not in a position to buffer the data in order to decode or to incrementally combine with previous transmissions associated with the same data. The buffered transmission may be soft-combined with a further transmission, like a redundancy version of the already received data, which may be send by the transmitter UE responsive to a NACK-message. However, in case the transmission is not buffered, there is nothing to combine with the RV received later so that the retransmission will not be efficient.

The LOST state as provided in accordance with embodiments of the first aspect addresses the above problem, e.g., in case there is not enough buffer space at the receiver UE, and indicating the LOST state allows the transmitter UE to transmit the current version of the transmission or retransmission. Thus, in case the transmission can be buffered at the receiver UE, for example because another unicast transmission from a different transmitter UE has terminated, a decoding may be attempted on the basis of the retransmitted current transmission rather than on the basis of a further redundancy version which may show degraded decoding performance at the receiver UE. This allows improving the total transmission reliability.

$2^{nd}$ Aspect

In accordance with embodiments of a second aspect, the receiver UE may report its current buffer state or buffer occupation so as to inform the transmitter UEs communicating with a receiver UE over the unicast sidelinks about the occupation status of the buffer thereby allowing the transmitter UEs to adapt their transmissions accordingly.

$3^{rd}$ Aspect

In accordance with embodiments of a third aspect of the present invention, a HARQ entity setup procedure may be employed which allows a negotiation among the communication partners, namely the transmitter UE (s) and the receiver UE for the unicast sidelink communication so as to determine the number of HARQ processes to be implemented for each unicast sidelink communication.

An advantage of the $2^{nd}$ and $3^{rd}$ aspects of the present invention is that situations are avoided in which the receiver UE runs out of buffer space, thereby avoiding or reducing the above discussed degradation in the transmission reliability as found in conventional approaches.

In the following, embodiments of the respective aspects of the present invention will be described in more detail.

$1^{st}$ Aspect

Embodiments in accordance with the first aspect provide a signaling from a receiver UE to a transmitter UE in case a current transmission has been lost at the receiver UE, i.e., was successfully identified but not buffered, e.g., in a HARQ buffer provided by the receiver UE.

Figure 5A:
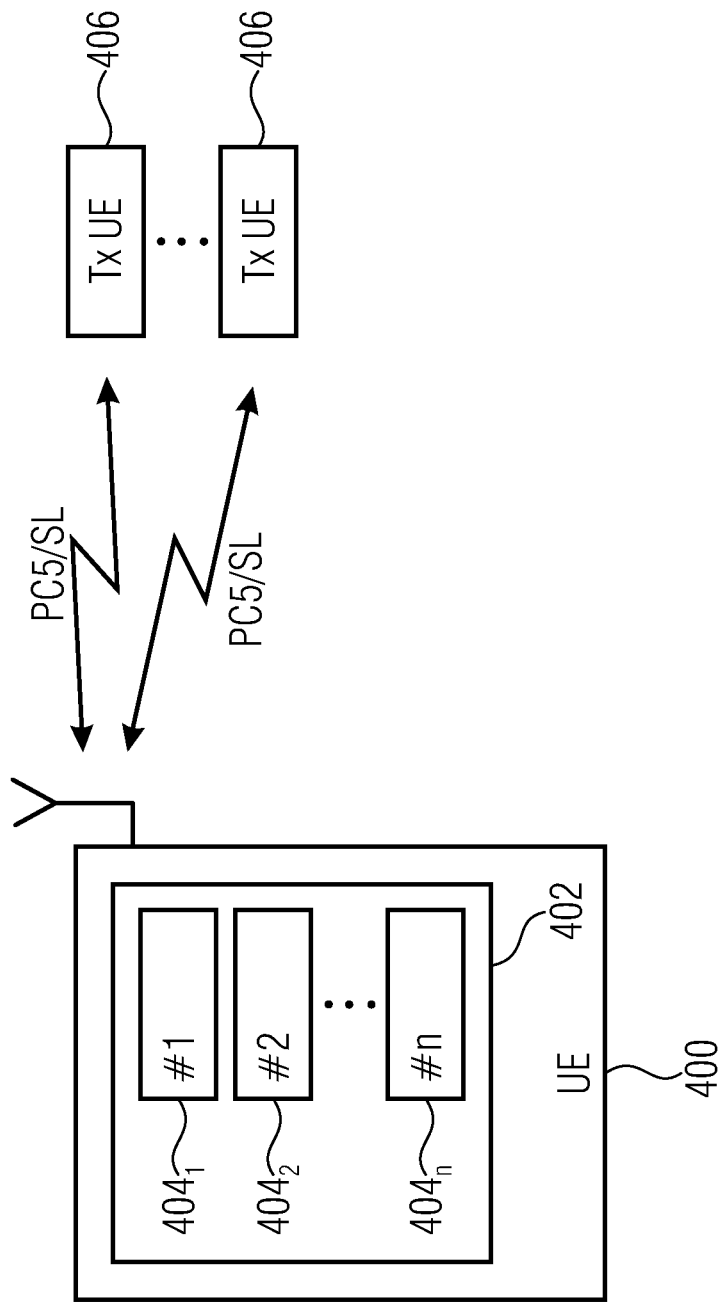
FIG. 5A schematically illustrates a receiver UE for buffering HARQ processes associated with respective unicast transmissions from one or more transmitter UEs.

FIG. 5A schematically illustrates a receiver UE 400 including memory 402 which may be used by the receiver UE 400 for allocating buffers or soft buffers $404_1$ to $404_n$ for a plurality of HARQ processes associated with respective unicast transmissions from one or more transmitter UEs 406 communicating with the receiver UE 400 over the sidelink PC5/SL for a unicast communication.

FIG. 5B illustrates a successfully identified and decodable transmission from the transmitter UE 406 to the receiver UE 400. At "1" the transmitter UE 406 may perform one or more transmissions at the given transmission time interval. In the depicted example the transmitter UE 406 performs two transmissions including the transmission of data or the transmission of a redundancy version of the data to the receiver UE 400. Each transmission RV1.1 and RV2.1 has associated therewith control data including the HARQ process IDs ID1 and ID2. In case the UE 400 successfully identifies the transmissions, as is indicated at "2", meaning that the receiver UE decodes the control data, in in case also the data is decodable, at "3" an acknowledgement ACK is signaled from the UE 400 to the transmitter UE 406. Responsive to the ACK, the transmitter may, if additional transmissions for the unicast sidelink communication are to be performed, perform the next transmission.

FIG. 5C illustrates a situation in which the transmission from the transmitter UE 406 can be identified by the receiver UE, e.g., the control data can be decoded, but the data was not decodable. Further, sufficient buffer space is assumed to be available at the receiver UE so that the non-decodable data is buffered at the receiver UE 400 in the buffers associated with the HARQ process ID for the transmission. Responsive to the non-successful decoding of the data, as indicated at "4", the receiver UE 400 sends a non-acknowledgment message, NACK, as indicated "5" to the receiver UE 406. Responsive to the NACK, the transmitter UE retransmits the transmission or sends a redundancy version for the respective transmissions, for example, RV1.2 and RV2.2 to the receiver UE 400, again together with control data including the HARQ process IDs ID1, ID2 so that, at the receiver UE, the transmissions RV1.2, RV2.2 may be combined with the buffered transmissions. The UE 400, at "7", may soft-combine the transmissions. Assuming that the combined versions can be decoded, an acknowledgement message, ACK, is sent to the transmitter UE 406 which may then start with the transmission of the next data, if desired or available.

FIG. 5D illustrates the handling of non-buffered transmission. The receiver UE 400 may receive from the transmitter UE 406 the transmissions RV1.1 and RV2.1 associated with the respective HARQ process IDs. Although the receiver UE decoded the control data and found that the data or payload data is not decodable, there may not be sufficient buffer available so that the transmission cannot be buffered. This may happen, e.g., in case all buffer space is already active and in use for unicast communications with one or more other transmitter UEs. Responsive to the detection of a successfully identified transmission which cannot be buffered, the UE 400 signals or indicates at "8" a LOST state to the transmitter UE 406. Responsive to recognizing the LOST state, the transmitter UE, at "9", transmits the original transmission RV1.1 and RV2.1 again to the UE 400. In case the UE 400, at the time of receiving the original transmission again, has free buffer space available, the transmissions may be stored or buffered, in case the data cannot be decoded. Otherwise, again, a LOST state may be signaled.

Thus, in accordance with embodiments of the first aspect, instead of only providing an ACK or NACK message, the receiver UE 400 marks a lost transmission, for example, due to a soft buffer overflow, as a "lost" transmission. Hence, the transmitter UE knows that its transmission, like a transmitted redundancy version of data, is lost and not stored in the soft buffer of the receiver UE. This allows the transmitter UE, for example, to either retransmit exactly the lost RV again or, by default, to start from an initial RV.

In accordance with embodiments, the respective states, namely the acknowledgement state, the non-acknowledgment state and the LOST state may be signaled using a base sequence. The respective states may be signaled or indicated by providing the base sequence with a certain cyclic shift or phase rotation. Associating a base sequence with a certain cyclic shift or phase rotation for signaling an acknowledgement or a non-acknowledgement in a HARQ process is described, for example, by Erik Dahlman, Stefan Parkvall, Johan Skold in "5G NR: The Next Generation Wireless Access Technology". In accordance with embodiments, the LOST state may be explicitly signaled as a third state in addition to the ACK state and the NACK state. The ACK state may use a base sequence with a cyclic shift by 0, while the NACK state may use the same base sequence with the cyclic shift by $2\pi/3$, and the LOST state may be signaled using the same base sequence with a cyclic shift by $4\pi/3$. Naturally, other cyclic shifts are also applicable.

In accordance with other embodiments a base sequence with different cyclic shifts may be employed, e.g., the base sequence with a first cyclic shift of for example 0 for signaling the ACK state, and the base sequence with a different cyclic shift of for example n, may be used for signaling the NACK state. The LOST state, i.e., a non-buffered transmission, is signaled by not transmitting the ACK state and not transmitting the NACK state.

In accordance with embodiments, the transmitter UE 406, responsive to receiving the indication that a transmission is not buffered at the receiver UE may:
  drop the transmission and/or back-off for a predefined time,
  override an already occupied HARQ process, or
  transmit the same RV again
  cause the receiver UE to switch from incremental redundancy to chase combining.

The transmitter UE 406 may base the decision as to how to proceed responsive to a LOST state indication based on certain parameters, like a QoS of the lost or non-buffered transmission, the
  QoS of the transmissions buffered already in the HARQ processes, and/or a number of the retransmission, namely whether the retransmission would be an initial transmission or not.

If the transmission associated with the received LOST state has a lower QoS when compared to the other transmissions already in the HARQ processes, the UE 406 drops the transmissions and/or backs-off for some time, because trying to transmit again immediately is most likely to have the same result, namely a non-buffered transmission.

If the transmission associated with the received LOST state is associated with a higher QoS when compared to the transmissions already in the active HARQ processes, the transmitter UE may reuse the existing or unfinished HARQ processes. This means that the transmitter UE may transmit a high QoS transmission with a HARQ process ID which is already occupied by another transmission together with the NDI toggled so that the receiver UE first flushes its buffer associated with the HARQ process ID and then saves the new transmission.

If incremental redundancy HARQ is applied and the lost transmission is not an initial transmission, the transmitter UE may change to chase combing and transmit a redundancy version that was already sent and for which a non-LOST state has been received. This is possible because for chase combining the receiver UE does not need to reserve extra soft bits because the received RV is combined with the previously received RV which is already buffered. Thus, no additional buffer space is needed.

$2^{nd}$ Aspect

In accordance with the second aspect of the present invention, rather than providing an additional HARQ state for indicating a non-buffered transmission, the receiver UE 400 (see FIG. 5A) may report to the currently active transmitter UEs 406, i.e., to its currently active unicast communication partners, an occupation of the buffer, also referred to as its current soft buffer occupation, using for example a layer 1 signaling in the physical sidelink feedback channel, PSFCH.

In accordance with this aspect, each active unicast communication partner is aware of the buffer capacity at the receiver UE so that, for example, dependent on the available free cover capabilities at the receiver UE, the number of parallel transmissions during a transmission time interval may be adapted accordingly so as to avoid non-buffering of any transmission.

For example, the receiver UE may signal to the transmitter UE
  that using more HARQ processes is possible, in case the buffer occupation is in a first state, like a low buffer occupation state,
  to maintain the currently used number of HARQ processes, in case the buffer occupation is in a second state, like a medium buffer occupation state,
  to reduce the number of HARQ processes used possible, in case the buffer occupation is in a third state, like a high buffer occupation state.

For example, the transmitter UE may
  increase the currently used number of HARQ processes, responsive to a report from the receiver UE indicating that the buffer occupation is in a first state, like a low buffer occupation state,
  maintain the currently used number of HARQ processes, responsive to a report from the receiver UE indicating that the buffer occupation is in a second state, like a medium buffer occupation state,
  reduce the currently used number of HARQ processes, responsive to a report from the receiver UE indicating that the buffer occupation is in a third state, like a high buffer occupation state.

In accordance with the first second aspects of the present invention, a fixed number of HARQ processes may be used. For example, the receiver UE and/or the transmitter UE may use a fixed number of HARQ processes for each unicast sidelink or a fixed total number of HARQ processes for all sidelinks. A fixed number of HARQ processes with a fixed number of bits for signaling the HARQ process ID in the SCI may be used, and the number may either be equal to the number of total HARQ processes or may be a fixed or preconfigured value to be used per unicast link.

For example, the receiver UE is may receive a control message, like a SCI, the which includes a number of bits for signaling a HARQ process ID associated with a HARQ process. The fixed number of HARQ processes may be defined, e.g., by a mobile communication standard, or may be preconfigured, e.g., during connection of the UE to the wireless communication system or during setup of the sidelink communication.

$3^{rd}$ Aspect

In accordance with the third aspect of the present invention, rather than providing an additional HARQ state for indicating a non-buffered transmission, a modified HARQ entity setup procedure is suggested. In accordance with embodiments of the third aspect, a new sidelink/PC5-RRC procedure may be implemented to allow the respective unicast communication partners to negotiate the HARQ processes to be used for a unicast communication. In other words, the third aspect of the present invention provides embodiments allows the communication partners to agree on the number of HARQ processes to be used for a unicast communication. For example, the transmitter UE 406 (see FIG. 5A) may initiate a RRC configuration procedure so as to indicate a number of HARQ processes it is planning to use for a current unicast link. For example, the transmitter UE 406 may plan to use four HARQ processes which need respective buffer space 404 in the receiver UE 400. The receiver UE 400, if such buffer space is available, may confirm the number. In case only a smaller buffer space is available so that the receiver UE is not able to accommodate or buffer transmissions for all HARQ processes, a smaller number HARQ processes may be signaled to the transmitter UE, i.e., a number that is different from the number requested by the transmitter UE. After this negotiation is terminated, both UEs reserve the agreed number of HARQ processes for the current unicast link.

For example, before such a configuration signaling, the number of HARQ processes may be zero, i.e., there is no HARQ procedure implemented, or the number of HARQ processes may be set to a default value, like four or eight HARQ processes. In case there is a default value the receiver UE may also initiate the RRC HARQ entity setup procedure in order to adapt the number of HARQ processes to the actual situation. Embodiments for the above-procedures will now be described in more detail with reference to FIG. 6 and FIG. 7.

Figure 6:
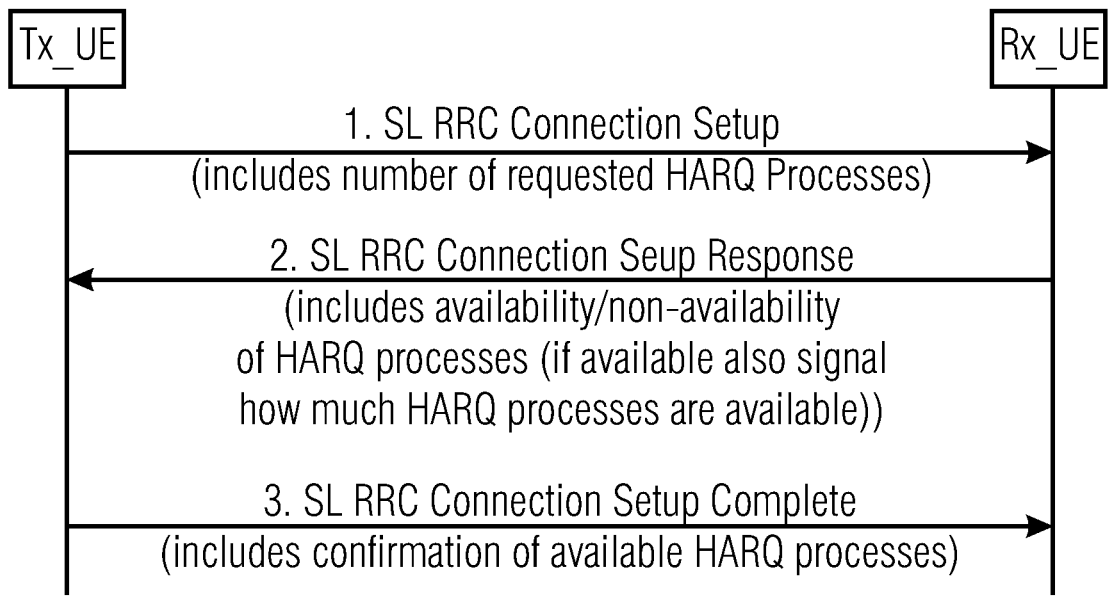
FIG. 6 illustrates an embodiment for a HARQ process setup by the transmitter UE.

FIG. 6 illustrates an embodiment for a HARQ process setup by the transmitter UE, like UE 406 in FIG. 5A. For configuring the HARQ processes, the transmitter UE 406 initially sends a sidelink RRC connection setup which includes or indicates the number of requested HARQ processes the transmitter UE intends to use for the unicast communication with the receiver UE 400. The receiver UE 400 signals to the transmitter UE 406 a SL RRC connection setup response which includes the availability/non-availability of HARQ processes and, if available, also the number of HARQ processes which can be made available for the unicast communication with the transmitter UE is indicated. In other words, the receiver UE 400 either confirms the requested number of HARQ processes or indicates a different number which is smaller than the requested number. Following the SL RRC connection setup response, the transmitter UE 406 sends the SL RRC connection setup complete message which includes a confirmation of the agreement, namely a confirmation of the available HARQ processes to be used for the communication.

Figure 7:
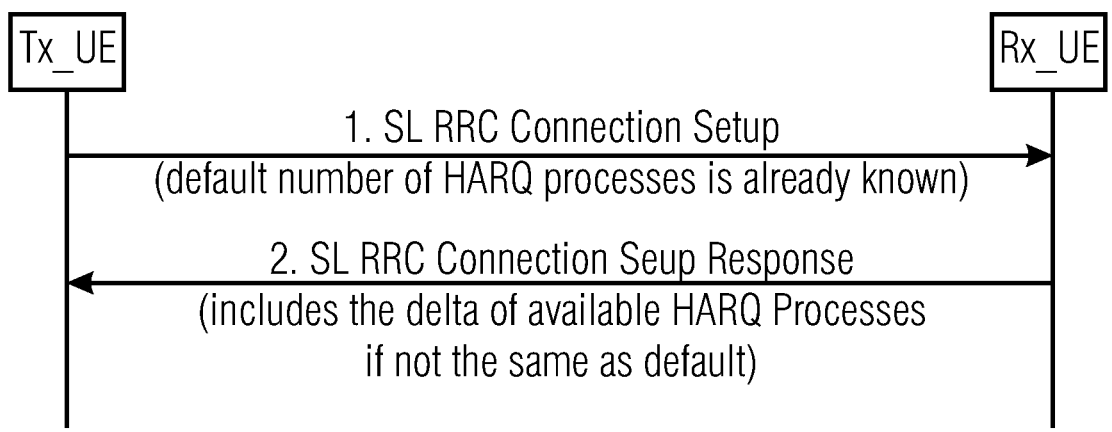
FIG. 7 illustrates an example for changing a number of available HARQ process numbers by a transmitter UE with respect to a default number.

FIG. 7 illustrates an example for changing a number of available HARQ process numbers by the transmitter UE with respect to a default number. Initially, the transmitter UE 406 sends the SL RRC connection setup message. No further information is included with regard to the HARQ processes, as the default number of HARQ processes is already known at the respective UEs and for the unicast communication between the transmitter UE 406 and the receiver UE 400, the transmitter UE intends to use the default number of HARQ processes. Responsive to the connection setup message, the receiver UE 400 sends a SL RRC connection setup response message. In case the default number of HARQ processes are available at the receiver UE 400, no further information regarding the HARQ processes is included in the connection setup response received at the receiver UE 406 which, responsive thereto, knows that the default number of HARQ processes may be employed. On the other hand, in case the receiver UE 400 has less than the default number of HARQ processes available, i.e., the number of available HARQ processes is not the same as the default number, the receiver UE 400 may signal in the connection setup response either the actual number of HARQ processes available to the transmitter UE 406 or it may indicate the difference or delta in available HARQ processes when compared to the default value to the transmitter UE 406. The transmitter UE 406 then uses the available number of HARQ processes as signaled from the receiver UE 400.

Figure 8:
FIG. 8 illustrates a reconfiguration signaling from a receiver UE to a transmitter UE 406 regarding a number of available HARQ processes.
Figure 9:
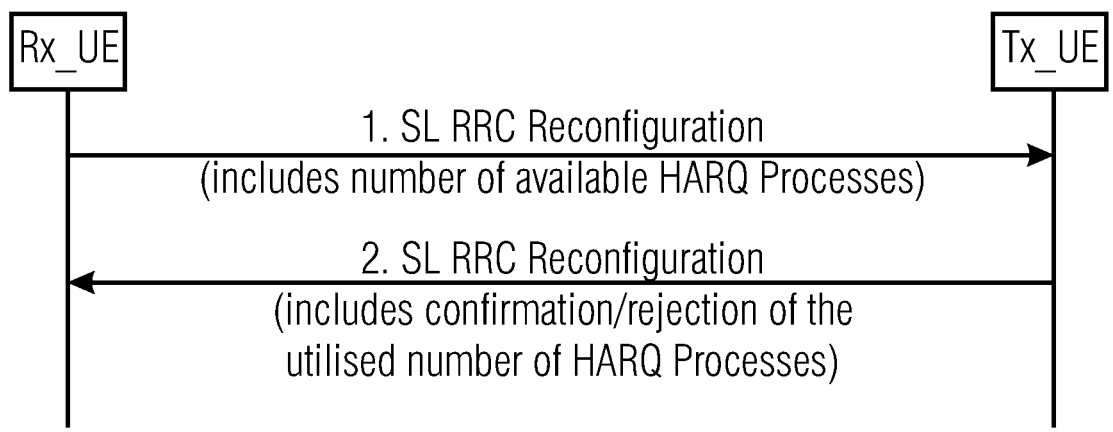
FIG. 9 illustrates a further embodiment for reporting a number of HARQ processes to a transmitter UE.

In accordance with other embodiments, the negotiation about the HARQ process to be used may be initiated by the receiver UE 400. For example, the receiver UE 400 may report an actual number of available HARQ processes to a transmitter UE 406, for example upon setup of the unicast communication or during the unicast communication, for example in case the buffer capacity changes. FIG. 8 and FIG. 9 illustrate embodiments for a receiver UE initiated HARQ process negotiation.

FIG. 8 illustrates the reconfiguration signaling from the receiver UE 400 to the transmitter UE 406 regarding the number of available HARQ processes. More specifically, the receiver UE 400 may send a SL RRC reconfiguration message to the transmitter UE 406 which includes the number of available HARQ processes at the receiver UE 400. In other words, the receiver UE reports a number of available HARQ processes to the transmitter UE which, in accordance with the embodiment of FIG. 8, responsive to the reconfiguration message, chooses or selects a number of HARQ processes to be used for the communication which may either be equal to the indicated number of available HARQ processes (the number indicated in the reconfiguration message) or may be a number less than the indicated number of available HARQ processes.

FIG. 9 illustrates a further embodiment for reporting the number of HARQ processes to the transmitter UE. More specifically, FIG. 9 illustrates the reconfiguration signaling for the receiver UE 400 to the transmitter UE 406 regarding the number of available HARQ processes. In a first message, similar to FIG. 8, the receiver UE 400 sends a SL RRC reconfiguration message including the number of HARQ processes available at the receiver UE. In accordance with the described embodiment, the transmitter UE 406 may either confirm the new number or may reject the new number and stay with the same number of HARQ processes or with a lower number of HARQ processes which is signaled to the receiver UE using the SL RRC reconfiguration message sent by the receiver UE.

In accordance with further embodiments of the third aspect, the negotiation of the HARQ processes to be used for a unicast communication between a transmitter UE and a receiver UE may not be between the respective UEs but may be handled by the base station or gNB in case the UEs communicating with each other are mode 1 UEs. In such a situation, the gNB may configure the HARQ processes assigned for the unicast link between the transmitter UE 406 and the receiver UE 400. The gNB, like the base station 300 in FIG. 4, may setup unicast bearers between the UEs, namely the receiver UE and the transmitter UE. Based on the UEs capability exchange signaling, the base station knows the total number of HARQ processes of each UE or the size of the soft buffer. On the basis of this information, the base station manages the HARQ processes at least for sidelink mode 1 unicast communications. For example, if both of the UEs are mode 1 UEs, i.e., are in-coverage, during bearer setup or during the unicast communication, the network, for example via the gNB, may configure the number of HARQ processes to be used by the UEs for the current unicast link. In other words, the gNB handles the HARQ process configuration on a per unicast sidelink basis. The configuration may be unidirectional, i.e., only for the unicast communication from the transmitter UE to the receiver UE, or bidirectional, i.e., the same HARQ process configuration may be used when the transmitter UE to the receiver UE switch so that the transmitter UE becomes the receiver UE and the receiver UE becomes the transmitter UE.

In accordance with embodiments, the HARQ process ID field in a SCI may be implicitly derived. For example, the size of the HARQ process ID field in the SCI may be implicitly derived from the agreed number of HARQ processes, for example, 4 HARQ processes equals 2 bits, 3 HARQ processes equals 2 bits, 8 HARQ processes equals 3 bits.

In accordance with the yet further embodiments, the HARQ processes for a reverse direction of the unicast communication may be implicitly derived. For example, when considering two UEs to communicate with each other via a sidelink, rather than initially configuring the HARQ processes only the unicast sidelink in a forward direction from the first UE to the second UE, at the time of setting up the connection also the HARQ processes for the unicast sidelink in the reverse direction from the second UE to the first UE may be configured. In accordance with embodiments, this may be done dependent or independent of a traffic on the forward/reverse direction. For example, when considering the transmitter and receiver UEs 406, 400 of FIG. 5A, when reversing the communication direction for a unicast communication from the receiver UE to the transmitter UE, and when assuming that the traffic is substantially symmetrical or the number of HARQ processes is symmetrical to reduce the configuration overhead, the number of HARQ processes already configured for both UEs for a communication from the transmitter UE to the receiver UE may be applied also for the reverse direction, i.e., when transmitting from the receiver UE to the transmitter UE, unless, for the reverse direction, a different number of HARQ processes is to be used, and in this case, the configured number of HARQ processes may be overwritten accordingly.

In accordance with other embodiments of the present invention, the number of HARQ processes may be dynamically adapted after setting up the unicast sidelink. For example, in case the transmitter UE 406 needs more HARQ processes, for example because more traffic is arriving, the transmitter UE may request more HARQ processes from the receiver UE. The transmitter UE may send to the receiver UE a request including the overall number of needed HARQ processes or the data in numbers when compared to the current number, i.e., the additional HARQ processes needed. In that case, provided the receiver UE has unallocated soft buffer available, the receiver UE may inform the transmitter UE how many HARQ processes are available in total or how many additional HARQ processes, like two more HARQ processes, may be supported.

Further, in accordance with other embodiments, in case the transmitter UE experiences less traffic, it may request a reduction of the number of allocated HARQ processes, and the receiver UE may unallocated soft buffer accordingly which lowers the burden on the receiver side.

General

Embodiments of the present invention have been described in detail above, and the respective embodiments and aspects may be implemented individually or two or more of the embodiments may be implemented in combination. It is noted that a UE may have multiple destination L2 IDs and/or multiple source L2 IDs depending on different transmission/receptions, e.g. unicast, groupcast and multicast.

Embodiments of the present invention have been described in detail above with reference to a sidelink communication using the PC5 interface. However, the present invention is not limited to the use of the PC5 interface. Any other interface allowing for a direct communication among one or more UEs may be employed, e.g., interfaces according to the IEEE 802.11p standard, the IEEE 802.15.4 standard (Zigbee), and others.

In some of the embodiments described above, reference has been made to respective vehicles being either in a mode in which SL resource allocation configuration or assistance is provided by a base station, e.g., the connected mode, also referred to as NR mode 1 or LTE mode 3 configuration, or vehicles being in a mode in which when no SL resource allocation configuration or assistance is provided by a base station, e.g., the idle mode, also referred to as NR mode 2 or LTE mode 4 configuration. However, the present invention is not limited to V2V communications or V2X communications, rather it is also applicable to any device-to-device communications, for example non-vehicular mobile users or stationary users that perform a sidelink communication, e.g., over the PC5 interface. Also, in such scenarios, the inventive aspects described above may be employed.

In accordance with embodiments, the wireless communication system may include a terrestrial network, or a non-terrestrial network, or networks or segments of networks using as a receiver an airborne vehicle or a spaceborne vehicle, or a combination thereof.

In accordance with embodiments, a receiver may comprise one or more of a mobile or stationary terminal, an IoT device, a ground-based vehicle, an aerial vehicle, a drone, a building, or any other item or device provided with network connectivity enabling the item/device to communicate using the wireless communication system, like a sensor or actuator. In accordance with embodiments, a transmitter may comprise one or more of a macro cell base station, or a small cell base station, or a spaceborne vehicle, like a satellite or a space, or an airborne vehicle, like a unmanned aircraft system (UAS), e.g., a tethered UAS, a lighter than air UAS (LTA), a heavier than air UAS (HTA) and a high altitude UAS platforms (HAPs), or any transmission/reception point (TRP) enabling an item or a device provided with network connectivity to communicate using the wireless communication system.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 10 illustrates an example of a computer system 500. The units or modules as well as the steps of the methods performed by these units may execute on one or more computer systems 500. The computer system 500 includes one or more processors 502, like a special purpose or a general-purpose digital signal processor. The processor 502 is connected to a communication infrastructure 504, like a bus or a network. The computer system 500 includes a main memory 506, e.g., a random-access memory (RAM), and a secondary memory 508, e.g., a hard disk drive and/or a removable storage drive. The secondary memory 508 may allow computer programs or other instructions to be loaded into the computer system 500. The computer system 500 may further include a communications interface 510 to allow software and data to be transferred between computer system 500 and external devices. The communication may be in the from electronic, electromagnetic, optical, or other signals capable of being handled by a communications interface. The communication may use a wire or a cable, fiber optics, a phone line, a cellular phone link, an RF link and other communications channels 512.

The terms "computer program medium" and "computer readable medium" are used to generally refer to tangible storage media such as removable storage units or a hard disk installed in a hard disk drive. These computer program products are means for providing software to the computer system 500. The computer programs, also referred to as computer control logic, are stored in main memory 506 and/or secondary memory 508. Computer programs may also be received via the communications interface 510. The computer program, when executed, enables the computer system 500 to implement the present invention. In particular, the computer program, when executed, enables processor 502 to implement the processes of the present invention, such as any of the methods described herein. Accordingly, such a computer program may represent a controller of the computer system 500. Where the disclosure is implemented using software, the software may be stored in a computer program product and loaded into computer system 500 using a removable storage drive, an interface, like communications interface 510.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

LIST OF ACRONYMS AND SYMBOLS

BS Base Station
CBR Channel Busy Ratio
D2D Device-to-Device
EN Emergency Notification
eNB Evolved Node B (base station)
FDM Frequency Division Multiplexing
LTE Long-Term Evolution
PC5 Interface using the Sidelink Channel for D2D communication
PPPP ProSe per packet priority
PRB Physical Resource Block
ProSe Proximity Services
RA Resource Allocation
SCI Sidelink Control Information
SL sidelink
sTTI Short Transmission Time Interval
TDM Time Division Multiplexing
TDMA Time Division Multiple Access
TPC Transmit power control/transmit power command
UE User Entity (User Terminal)
URLLC Ultra-Reliable Low-Latency Communication
V2V Vehicle-to-vehicle
V2I Vehicle-to-infrastructure
V2P Vehicle-to-pedestrian
V2N Vehicle-to-network
V2X Vehicle-to-everything, i.e., V2V, V2I, V2P, V2N

The invention claimed is:

1. A user device (UE) for a wireless communication system, the wireless communication system including a plurality of user devices (UEs),
   wherein the UE is configured to:
      communicate with one or more transmitting UEs using a sidelink,
      support a number of Hybrid Automatic Repeat Request (HARQ) processes, and buffer one or more transmissions for each HARQ process,
   wherein, during a unicast communication with a transmitting UE of the one or more transmitting UEs using the sidelink, the UE is configured to:

receive from the transmitting UE a transmission during a transmission time interval, the transmission associated with control data including a HARQ process identifier (ID), buffer the received transmission for the HARQ process, and combine buffered transmissions prior to decoding, wherein, in case a successfully identified transmission is not buffered, the UE is configured to indicate to the transmitting UE that the transmission is not buffered at the UE, wherein the UE is further configured to signal:
  a first state indicating a successful transmission over the sidelink, so as to enable the transmitting UE to perform a new transmission,
  a second state indicating a non-successful transmission over the sidelink, so as to request a retransmission from the transmitting UE, and
  a third state indicating that a successfully identified transmission over the sidelink is not buffered by the UE, and wherein the first, second, and third states are different.

2. The user device of claim 1, wherein the UE is configured to signal;
  the first state using a base sequence with a first cyclic shift or phase rotation,
  the second state using the base sequence with a second cyclic shift or phase rotation, and
  the third state using the base sequence with a third cyclic shift or phase rotation, and wherein the first, second, and third cyclic shifts or phase rotations are different.

3. The user device of claim 2, wherein the first cyclic shift or phase rotation is 0, the second cyclic shift or phase rotation is 2p/3, and the third cyclic shift or phase rotation is 4 p/3.

4. The user device of claim 1, wherein the UE is configured to signal;
  the first state using a base sequence with a first cyclic shift or phase rotation,
  the second state using the base sequence with a second cyclic shift or phase rotation,
  the third state by not transmitting the base sequence, and wherein the first and second cyclic shifts or phase rotations are different.

5. The user device of claim 4, wherein the first cyclic shift or phase rotation is 0, aid the second cyclic shift or phase rotation is p.

6. The user device of claim 1, wherein the UE is configured to signal a message including a plurality of bits, wherein
  the first state is indicated by a first combination of the plurality of bits,
  the second state is indicated by a second combination of the plurality of bits, and
  the third state is indicated by a third combination of the plurality of bits, and wherein the first, second and third combinations are different.

7. The user device of claim 6, wherein the first combination is 00, the second combination is 10, and the third combination is 11.

8. The user device of claim 1, wherein the UE comprises one or more of
  a mobile terminal, or
  stationary terminal, or
  cellular internet of things-user device (IoT-UE), or
  vehicular UE, or
  vehicular group leader (GL) UE
  an internet of things (IoT) or narrowband internet of things (NB-IoT) device, or
  a ground based vehicle, or
  an aerial vehicle, or
  a drone, or
  a moving base station, or
  road side unit, or
  a building, or
  an item or device provided with network connectivity enabling the item/device to communicate using the wireless communication system.

9. A user device (UE) for a wireless communication system, the wireless communication system including a plurality of user devices (UEs),
  wherein the UE is configured to:
    communicate with one or more receiving UEs using a sidelink, and
    support a number of Hybrid Automatic Repeat Request (HARQ) processes,
  wherein, during a unicast communication with a receiving UE of the one or more receiving UEs using the sidelink, the UE is configured to:
    transmit to the receiving UE a transmission during a transmission time interval, the transmission associated with control data including a HARQ process identifier (ID), and receive a feedback from the receiving UE,
  wherein the feedback comprises:
    a first state indicating a successful transmission over the sidelink,
    a second state indicating a non-successful transmission over the sidelink, and the UE is configured to perform a retransmission responsive to the second state, and
    a third state indicating that a successfully identified transmission over the sidelink is not buffered by the receiving UE, and
  wherein the first, second and third states are different.

10. The user device of claim 9 wherein, responsive to the feedback that the transmission is not buffered at the receiving UE, the UE is configured to cause one or more of the following actions:
  drop the transmission and/or back-off for a predefined time,
  overwrite an already occupied HARQ process,
  retransmit the same transmission,
  causing the receiving UE to switch from Incremental Redundancy to Chase Combining.

11. The user device of claim 10, wherein the UE is configured to decide the action dependent on one or more of:
  a quality of service (QoS) of the transmission associated with the non-buffered transmission,
  a QoS of the transmissions already in active HARQ processes,
  a number of retransmissions.

12. The user device of claim 11, wherein
  if the non-buffered transmission has a lower QoS compared to other transmissions already in the active HARQ processes, the UE is configured to drop the transmission and/or to back-off fora period of time,
  if the non-buffered transmission has a higher QoS compared to the transmissions already in the active HARQ processes, the UE is configured to transmit the high QoS transmission with a HARQ process identifier which is already occupied by another transmission, and cause the receiving UE to flush the buffer associated with the already occupied HARQ process ID, and to save the new transmission, and in case Incremental Redundancy HARQ is used and the non-buffered transmission is not the initial transmission, the UE is configured to change to the Chase Combining and to retransmit a transmission already sent and for which a successful buffering but failed decoding was signaled.

13. A wireless communication system, comprising a plurality of user devices (UEs) and configured for a sidelink communication using resources from a set of sidelink resources of the wireless communication system, wherein the plurality of UEs comprises at least one first user device (UE), the at least one first UE configured to:
communicate with one or more second UEs using a sidelink,
support a number of Hybrid Automatic Repeat Request (HARQ) processes, and
buffer one or more transmissions for each HARQ process, wherein, during a unicast communication with one second UE of the one or more second UEs using the sidelink, the at least one first UE is configured to
receive from the one second UE a transmission during a transmission time interval, the transmission associated with control data including a HARQ process identifier,
buffer the received transmission for the HARQ process, and
combine buffered transmissions prior to decoding, wherein, in case a successfully identified transmission is not buffered, the at least one first UE is configured to indicate to the one second UE that the transmission is not buffered at the at least one first UE, and wherein the at least one first UE is further configured to signal:
a first state indicating a successful transmission over the sidelink, so as to enable the one second UE to perform a new transmission,
a second state indicating a non-successful transmission over the sidelink, so as to request a retransmission from the one second UE, and
a third state indicating that a successfully identified transmission over the sidelink is not buffered by the at least one first UE, and wherein the first, second and third states are different.

14. The wireless communication system of claim 13, comprising one or more base stations, wherein the base station comprises one or more of
a macro cell base station, or
a small cell base station, or
a central unit of a base station, or
a distributed unit of a base station, or
a road side unit, or
a UE, or
a group leader (GL)
a relay or
a remote radio head, or
an action message format (AMF), or
a standard message format (SMF), or
a core network entity, or
mobile edge computing entity, or
a network slice as in the NR or 5G core context, or
any transmission/reception point (TRP) enabling an item or a device to communicate using the wireless communication system, the item or device being provided with network connectivity to communicate using the wireless communication system.

15. The wireless communication system of claim 13, wherein the one second UE is configured to:
communicate with the at least one first UE using a sidelink, and
support a number of HARQ processes, wherein, during a unicast communication with the at least one first UE using the sidelink, the one second UE is configured to:
transmit to the at least one first UE a transmission during a transmission time interval, the transmission associated to control data including a HARQ process ID, and
receive at the one second UE the signal as a feedback from the at least one first UE, which signals the first state, the second state, or the third state.

16. A method for a sidelink communication between a receiving user device (UE) and a transmitting UE in a wireless communication system, the wireless communication system including a plurality of user devices (UEs), the sidelink communication supporting a number of Hybrid Automatic Repeat Request(HARQ) processes, the method comprising:
receiving, by the receiving UE, from the transmitting UE a transmission during a transmission time interval, the transmission associated with control data including a HARQ process identifier (ID),
buffering the received transmission for the HARQ process by the receiving UE, and
combining buffered transmissions prior to decoding by the receiving UE, wherein, in case a successfully identified transmission is not buffered, the receiving UE indicates to the transmitting UE that the transmission is not buffered at the receiving UE, wherein the receiving UE is configured to signal:
a first state indicating a successful transmission over the sidelink, so as to enable the transmitting UE to perform a new transmission,
a second state indicating a non-successful transmission over the sidelink, so as to request a retransmission from the transmitting UE, and
a third state indicating that a successfully identified transmission over the sidelink is not buffered by the receiving UE, and wherein the first, second and third states are different.

17. The method of claim 16, further comprising:
transmitting to the receiving UE the transmission during the transmission time interval, the transmission associated with the control, data including the HARQ process identifier (ID), and
receiving at the transmitting UE the signal as a feedback from the receiving UE, which signals the first state, the second state, or the third state.

18. A non-transitory computer program product comprising a computer readable medium storing instructions which, when executed on a computer, perform a method for a sidelink communication between a receiving user device (UE) and a transmitting UE in a wireless communication system, the wireless communication system including a plurality of user devices (UEs), the sidelink communication supporting a certain number of Hybrid Automatic Repeat Request(HARQ) processes, the method comprising:
receiving from the transmitting UE a transmission during a transmission time interval, the transmission associated with control data including a HARQ process identifier, buffering the received transmission for the HARQ process by the receiving UE, and combining buffered transmissions prior to decoding by the receiving UE, wherein, in case a successfully identified transmission is not buffered, the receiving UE indicates to the transmitting UE that the transmission is not buffered at the receiving UE, wherein the receiving UE signals:
- a first state indicating a successful transmission over the sidelink, so as to enable the transmitting UE to perform a new transmission,
- a second state indicating a non-successful transmission over the sidelink, so as to request a retransmission from the transmitting UE, and
- a third state indicating that a successfully identified transmission over the sidelink is not buffered by the receiving UE, and wherein the first, second, and third states are different.

* * * * *